US010832230B2

(12) United States Patent
Franaszek et al.

(10) Patent No.: US 10,832,230 B2
(45) Date of Patent: Nov. 10, 2020

(54) SCALABLE AND DISTRIBUTED SHARED LEDGER TRANSACTION MANAGEMENT

(71) Applicant: International Business Machines Corporation, Armonk, NY (US)

(72) Inventors: Peter A. Franaszek, Yorktown Heights, NY (US); Mark N. Wegman, Mt. Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 485 days.

(21) Appl. No.: 15/478,438

(22) Filed: Apr. 4, 2017

(65) Prior Publication Data
US 2018/0285838 A1    Oct. 4, 2018

(51) Int. Cl.
*G06Q 40/00* (2012.01)
*G06Q 20/06* (2012.01)
*G06Q 20/42* (2012.01)
*H04L 9/32* (2006.01)
*G06Q 20/40* (2012.01)

(52) U.S. Cl.
CPC ....... *G06Q 20/0655* (2013.01); *G06Q 20/065* (2013.01); *G06Q 20/401* (2013.01); *G06Q 20/42* (2013.01); *H04L 9/3236* (2013.01); *H04L 9/3247* (2013.01); *H04L 9/3297* (2013.01); *G06Q 2220/00* (2013.01); *H04L 2209/38* (2013.01); *H04L 2209/56* (2013.01)

(58) Field of Classification Search
None
See application file for complete search history.

(56) References Cited

U.S. PATENT DOCUMENTS

2017/0180128 A1* 6/2017 Lu ............................. H04L 9/08
2017/0213289 A1* 7/2017 Doney ................... G06Q 40/06
2017/0287090 A1* 10/2017 Hunn .................... G06F 40/166

OTHER PUBLICATIONS

U.S. Appl. No. 15/478,523, filed Apr. 4, 2017.

* cited by examiner

*Primary Examiner* — Olabode Akintola

(57) ABSTRACT

A shared ledger of transactions may be used for various purposes and may be later accessed by interested parties for ledger verification. Authenticity of transactions requires active measures to ensure transaction participants including parties to the transactions, observers to the transaction, etc., are providing accurate information for each transaction. One example method of operation may include one or more of performing one or more transactions between a subset of participants of a shared ledger system or subsystem which includes the subset of participants and witnesses assigned to the subset of participants, and synchronizing the one or more transactions exclusively by the subset of participants and the assigned witnesses, so the one or more of the transactions between the subset of participants exist with no common witnesses.

20 Claims, 12 Drawing Sheets

380

SCALABLE AND DISTRIBUTED SHARED LEDGER TRANSACTION MANAGEMENT

TECHNICAL FIELD

This application generally relates to managing transactions in a distributed ledger, and more particularly, scalable and distributed shared ledger transaction management.

BACKGROUND

In a shared ledger, conventionally, at any given time there is one assigned machine or account in charge of all shared ledger transactions including the order of transactions, the processing of the transactions, etc. With BITCOIN, there is one party in charge of managing the transactions which may include multiple different miner entities, however, one party is still in charge of the management effort for any particular block that goes into the chain.

Blockchains are data structures introduced in concert with Bitcoin. The aim is to ensure secure records of transactions between multiple parties so that records are secure and cannot be tampered with or falsified. Certain features include witnessing, where multiple participants maintain copies, cryptographic signatures for authentication, and public/private key cryptography for privacy. Currently, there are certain issues associated with scaling, witnessing, and the structures of shared ledgers. The aim is to provide a framework for scalable, efficient and trustworthy shared ledgers. Witnesses otherwise known as 'endorsers' or 'observers' are parties to a transaction solely for the purpose of proving the transaction took place and/or is valid.

In the BITCOIN shared ledger, any participant can be a party to a transaction. These transactions are then gathered into blocks by participants who have performed the requisite proof-of-work. Once finalized, the transaction, and, in turn, blocks are then added onto the chain. Conflicting transactions are generally eliminated via curtailing forks in the chain. This is performed by simply eliminating the shorter chain following a fork. The BITCOIN chain is self-contained, in the sense that it deals with quantities entirely held in the chain. Other applications of shared ledger notions deal with quantities outside the chain, for example, securities or moneys, and the concept of proof of work does not apply, such as in a shared ledger. In that example, transactions are often performed one at a time, in a sequential order via a multi-step protocol. The protocol involves multiple messages per transaction. Transactions performed in a given time period are then gathered into a block by a designated leader for that period. Blocks are then assembled into a sequence or chain.

In BITCOIN, miners are ultimately responsible for shared ledger transaction finalization. The conventional approach to processing transactions may be deemed not-scalable. With shared ledgers or distributed ledgers being adopted for interactions between various parties, the conventional approaches lack scalability due to a single point of synchronization and the size of the witness set.

SUMMARY

One example embodiment may include a method of operation which may include one or more of identifying a number of potential transactions, identifying a number of participants and a number of witnesses associated with the number of potential transactions, and each of the witnesses is assigned to one or more of the participants. The method may also include selecting a first of the potential transactions to be completed, selecting a first subset of the witnesses assigned to a first subset of the one or more participants associated with the first potential transaction, and selecting a second of the potential transactions to be completed and stored, selecting a second subset of the plurality of witnesses assigned to a second subset of the one or more participants associated with the second potential transaction, and completing the first and second potential transactions, so the first subset of the witnesses includes one or more different witnesses than the second subset of the witnesses.

Another example embodiment may include a method that provides one or more of identifying a plurality of potential shared ledger transactions, assigning a first subset of a plurality of potential observers to witness a first transaction of the plurality of potential shared ledger transactions, and the first subset of the plurality of potential observers are assigned to one or more of a plurality of participants to the first transaction for a first period of time, assigning a second subset of the plurality of potential observers to witness a second transaction of the plurality of potential shared ledger transactions, wherein the second subset of the plurality of potential observers are assigned to one or more of a plurality of participants to the second transaction for a second period of time, and completing the first and second potential shared ledger transactions with the correspondingly assigned first subset of potential observers and second subset of potential observers prior to the first period of time and the second period of time expiring, wherein the first subset of potential observers are disjoint from the second subset of potential observers.

Still another example embodiment may include an apparatus that includes a processor configured to identify a plurality of potential shared ledger transactions, assign a first subset of a plurality of potential observers to witness a first transaction of the plurality of potential shared ledger transactions, the first subset of the plurality of potential observers are assigned to one or more of a plurality of participants to the first transaction for a first period of time, assign a second subset of the plurality of potential observers to witness a second transaction of the plurality of potential shared ledger transactions, wherein the second subset of the plurality of potential observers are assigned to one or more of a plurality of participants to the second transaction for a second period of time, and complete the first and second potential shared ledger transactions with the correspondingly assigned first subset of potential observers and second subset of potential observers prior to the first period of time and the second period of time expiring, wherein the first subset of potential observers are disjoint from the second subset of potential observers.

Yet still a further example embodiment may include a non-transitory computer readable storage medium configured to store instructions that when executed cause a processor to perform one or more of identifying a plurality of potential shared ledger transactions, assigning a first subset of a plurality of potential observers to witness a first transaction of the plurality of potential shared ledger transactions, wherein the first subset of the plurality of potential observers are assigned to one or more of a plurality of participants to the first transaction for a first period of time, assigning a second subset of the plurality of potential observers to witness a second transaction of the plurality of potential shared ledger transactions, wherein the second subset of the plurality of potential observers are assigned to one or more of a plurality of participants to the second transaction for a second period of time, and completing the first and second potential shared ledger transactions with the correspondingly assigned first subset of potential observers and second subset of potential observers prior to the first period of time and the second period of time expiring, wherein the first subset of potential observers are disjoint from the second subset of potential observers.

Still yet a further example embodiment may include a method that provides one or more of identifying a set of participants to one or more transactions, transmitting a request from an initiating participant to enable each of the set of participants to generate local numbers based on a number source, forwarding the local numbers to one or more of the set of participants before expiration of a specified time interval, receiving the local numbers at the initiating participant, and generating a final number based on the local numbers received, wherein after a last participant among the set of participants has forwarded the local number, none of the set of participants can obtain the final number until after a limited amount of time.

Yet still another example embodiment may include an apparatus that includes a processor configured to identify a set of participants to one or more transactions, a transmitter configured to transmit a request from an initiating participant to enable each of the set of participants to generate local numbers based on a number source, and transmit the local numbers to one or more of the set of participants before expiration of a specified time interval, and a receiver configured to receive the local numbers at the initiating participant, and the processor is further configured to generate a final number based on the local numbers received, wherein after a last participant among the set of participants has forwarded the local number, none of the set of participants can obtain the final number until after a limited amount of time.

Yet another example embodiment may include a non-transitory computer readable storage medium configured to store instructions that when executed cause a processor to perform one or more of identifying a set of participants to one or more transactions, transmitting a request from an initiating participant to enable each of the set of participants to generate local numbers based on a number source, forwarding the local numbers to one or more of the set of participants before expiration of a specified time interval, receiving the local numbers at the initiating participant, and generating a final number based on the local numbers received, wherein after a last participant among the set of participants has forwarded the local number, none of the set of participants can obtain the final number until after a limited amount of time.

Another example embodiment may include a method that includes one or more of performing one or more transactions between a subset of participants of a shared ledger system or subsystem which comprises the subset of participants and witnesses assigned to the subset of participants, and synchronizing the one or more transactions exclusively by the subset of participants and the assigned witnesses, the one or more of the transactions between the subset of participants exist with no common witnesses.

Yet a further example embodiment may include an apparatus that includes a processor configured to perform one or more transactions between a subset of participants of a shared ledger system or subsystem which comprises the subset of participants and witnesses assigned to the subset of participants, and the processor is also configured to synchronize the one or more transactions exclusively by the subset of participants and the assigned witnesses, the one or more of the transactions between the subset of participants exist with no common witnesses.

Also, another example embodiment may include a non-transitory computer readable storage medium that includes one or more of performing one or more transactions between a subset of participants of a shared ledger system or subsystem which comprises the subset of participants and witnesses assigned to the subset of participants, and synchronizing the one or more transactions exclusively by the subset of participants and the assigned witnesses, the one or more of the transactions between the subset of participants exist with no common witnesses.

DETAILED DESCRIPTION

Figure 1A:
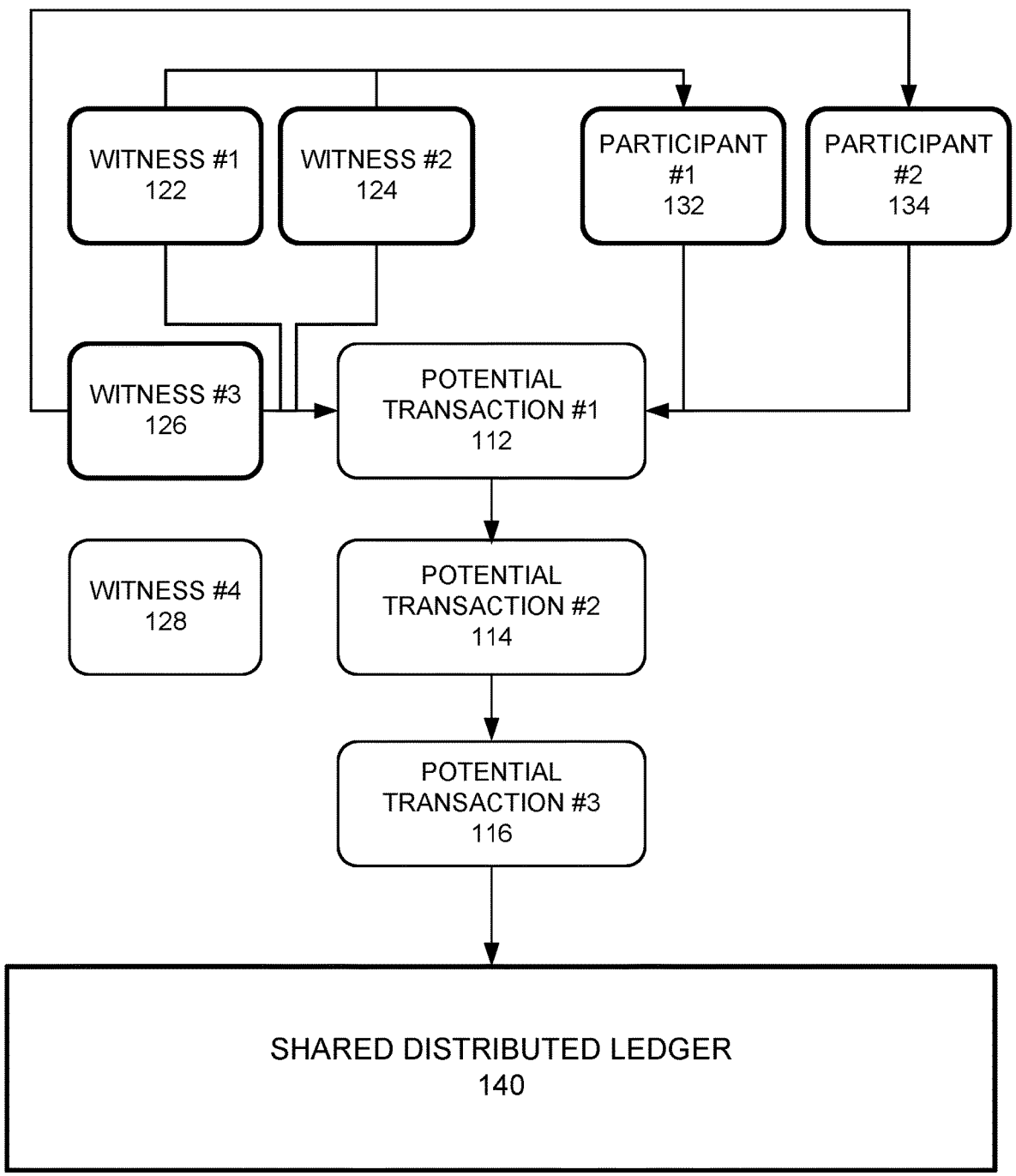
FIG. 1A illustrates a first shared ledger logic diagram of managing witness and participant assignments to a first transaction in a shared ledger according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message.

The instant application relates to managing transactions in a distributed ledger, and more particularly, to dynamic scaling and management of transactions based on predetermined management criteria. Distributed ledgers are often implemented using blockchains.

According to example embodiments, Transactions have inevitable participants who may be deemed parties to the transaction, such as buyer, seller, banker, etc. Shared ledger transactions also have inevitable witnesses, the witnesses could be participants but are required to be recognized in the ledger as parties who approve the transaction via signing the transaction digitally for the ledger to indicate actual agreement to the transaction. Those participants who may be deemed witnesses or observers to the transaction are assigned to perform a task and assist with confirming the transaction is a real transactions and not fraudulent.

In order to finalize a transaction, a final message must be sent, that message could be corrupt and thus the procedure may ensure the final message(s) are valid. Full witnessing occurs if the assigned witnesses to the transaction(s) all agree, have knowledge, and/or are informed that all other witnesses have observed the same content. So long as one party is responsible for the message that finalizes the transaction, that party has an unfair advantage. If all the witnesses are colluding with one party, then that party still has an advantage. The witnesses assigned to a particular participant of a transaction may be identified before the transaction and/or contemporaneously with the transaction. The entries for a witness subset assigned to a particular transaction or participant may be stored in a memory location either in the distributed ledger itself, a user profile of the participant and/or in a profile associated with a witness account or it may be that the subset is calculable from the above and other potential information. Additionally, each participant may have a personal store information source where information is stored, such as transaction records of transactions conducted by the participant and/or witness history of witnesses assigned to the participant and assigned to transactions associated with the participant.

In one example of witnesses to a distributed ledger transaction, it may be assumed that the chances of a witness being corrupt is approximately equal to $\frac{1}{10}$th of all the witnesses as being invalid witnesses. In this example, each party may sign both the transaction and a time stamp to ensure a predefined time threshold has been observed for completing the transaction. In this example, it is assumed that 10 witnesses are arranged for a given two-party transaction. Then the odds that all are corrupt is $10^{-10}$, which is low enough that it can be assumed it won't happen. The odds that one of them is corrupt is much higher and is thus too high to ignore. The corrupt witness will not benefit until the legitimate witnesses have signed, because confirming the transaction in the ring requires all ring witnesses first confirm via a confirmation message. Also, no legitimate witness will sign if the transaction is too old (i.e., too much time has lapsed). As a result, a reasonable time period must be established to provide at least one legitimate witness with enough time to have viewed enough information to confirm that the transaction is legitimate. If a ring configuration does not confirm the transaction, the legitimate witness may forward the transaction information to a star configuration.

Continuing with the same example, a star may have 60 witnesses and uses a Liskov protocol. In this example, as long as 40 of those witnesses are legitimate then the transaction will be approved. An expression to identify the odds that no more than 20 of the witnesses out of 60 are corrupt or that exactly 20 are corrupt may provide: $60\ C\ 20*(0.9\ \hat{}\ 40)*(0.1\ \hat{}\ 20)$ or approximately $4*10^{15}*e^{-4}*10^{-20}$ which is less than $\frac{1}{10,000}$ which might provide a result that is acceptable. If such a result is not acceptable, a larger number that is greater than 60 may be used.

In another example, the number of participants to a transaction may be arbitrary. As a result, the 'corrupt' member will not provide false data and/or attempt to block the transaction because doing so will reveal themselves. There are two witness message topologies including a ring and a star, where participants send and receive messages directly to witnesses. In the ring, messages have been forwarded between witnesses, so that each witness knows that the other witnesses have seen the information. In the star, each witness can supposedly observe the same information if here is no cheating and this is because there is no cross-checking between witnesses. In operation, a contract C1 is sent to witness set W1 and C2 to W2, etc. The contract may be cancelled before it is carried-out. Now, there are signed statements from W1 for C1 and W2 for C2. The approach could be used for falsifying an arrangement where W1 and W2 are witnesses to a "contract" which is different for two witness sets.

Scalability requires dynamic assignment of witnesses to various transactions as opposed to one set of witnesses to all transactions. In general, any shared ledger transaction could have a set of participants (i.e., one or more) which may interact to form transactions. Also, a set of witnesses (i.e., one or more) to witness the transactions is assumed for each transaction. The witnesses may also be participants. Each participant may have a set of assigned witnesses. The witnesses may be sufficiently numerous so that a sufficiently large subset is available. Once a transaction is agreed on between a set of participants, a set of witnesses is also agreed on among several potential sets of witnesses, and the set of witnesses is selected from a respective set of the participants' assigned witness sets, which may be established dynamically on a per transaction basis or at system initiation. The transaction may then be described to the assigned witnesses, who interact with each other and with the participants to ensure a full witnessing status defined as a state where each witness acknowledges that the transaction has been reviewed and seen and that the other assigned witnesses have seen the transaction.

The transaction may be deemed complete when all or a predefined percentage (i.e., 90 percent) of the witnesses have confirmed the transaction. If the witnesses cannot come to an agreement they may forward to a second set, or, third set of witnesses, providing those witness sets have been previously agreed to in advance. At the onset of each transaction, the participant(s) identifies the witnesses which will be part of the transaction. A participant may have one transaction being conducted at a time or is able to ensure that the transaction(s) are not conflicting with other simultaneously occurring transactions based on the products being bought or sold and/or the time frame by which those products are sent and/or received. Each resource/product is associated with a particular participant. For example, if a chocolate bar is owned by a first participant then there is a record of that chocolate bar, the witnesses linked to the chocolate bar transaction, and one or more participants linked to the chocolate bar. Continuing with this example, if the first participant who currently owns the chocolate bar sells the chocolate bar then a quantity of the chocolate bar for the first participant goes from one to zero (i.e., assuming the first participant only had one chocolate bar). The buyer participant/second participant to that transaction would have their quantity of chocolate bars go up. The resource quantities and related information for each participant is unique to that particular participant and may be used to formulate the transactions(s).

All messages are cryptographically signed via a public key encryption. Messages may be forwarded after signing, and shortened via hashing and signing. There are two example topologies for performing the messaging, such as a star and a ring. One example condition on the participants may include that the resources being traded in the transaction are disjointed, and that each participant has a single transaction in process at a time. This ensures that the protocol is equivalent to a "two phase commit" status which is known to databases, and so that the transactions are serializable as opposed to just serialized. As a result, there is no need for complete serialization. A transaction is deemed ready to complete when a sufficient set of witnesses has completed witnessing. Also, before initiating a transaction, a participant may be required to ensure that the transaction will not affect other subsequent transactions in queue. For example, if participant 'P' is in the process of selling a ton of potatoes, the participant may be required to check and confirm that there is a ton currently available even if all other transactions in the queue require similar quantities of potatoes. Additionally, witnesses may be required to determine the terms of the transaction are valid, and in this case, the quantity is available for trade. This is equivalent to a process of a two-phase commit in databases which ensures serializable transactions. Each participant may maintain records for one's own transactions, and for transactions that the participant may have served as a witness. The participants may be responsible for inquiring with the subset of witnesses to ensure they are available to perform the witnessing of the potential transaction. A transaction is deemed 'potential' since it is only considered an actual transaction once it has been completed (i.e., witnessed, confirmed, recorded in the shared ledger, etc.). Each witness may store the set of transactions they have witnessed or at least a summary of those transaction in which they participated. The witness summary may be accessible at any time to auditors of the transactions.

FIG. 1A illustrates a first shared ledger logic diagram of managing witness and participant assignments to a first transaction in a shared ledger according to example embodiments. Referring to FIG. 1A, the logic block diagram example 100 includes a series of potential transactions 112, 114 and 116, which may be identified as having a particular order or may have an arbitrary order but may be in a particular queue for processing and finalization. Each transaction may have one or more participants 132/134. Most transactions have one or two participants, however, the type and number of participants may vary depending on the nature of the transaction (i.e., buyer, seller, banker, mediator, product management, etc.). The witnesses to the transaction may be assigned based on requirements of the shared ledger. For example, the shared ledger may require two or more witnesses and at least one witness that is not a participant. The witnesses 122/124/126/128 may be algorithmically assigned to the participants depending on the shared ledger requirements of the smart contract requirements. For example, the witnesses can be dynamically assigned to a transaction depending on their affiliation with the participants. In this example of FIG. 1A, the participant #1 132 has two witnesses assigned 122 and 124. The second participant #2 134 has one witness assigned 126. The order of the participants, the number of the participants and the type of transaction may all be dynamically identified and assigned on a per transaction basis to make each potential transaction which is processed and finalized in the shared ledger a unique transaction that is not readily processed by a fraudulent party or parties. In this example, witness #4 128 is not assigned to any of the participants and is not part of the transaction assignment. The finalized transaction will be stored in the shared ledger 140.

Figure 1B:
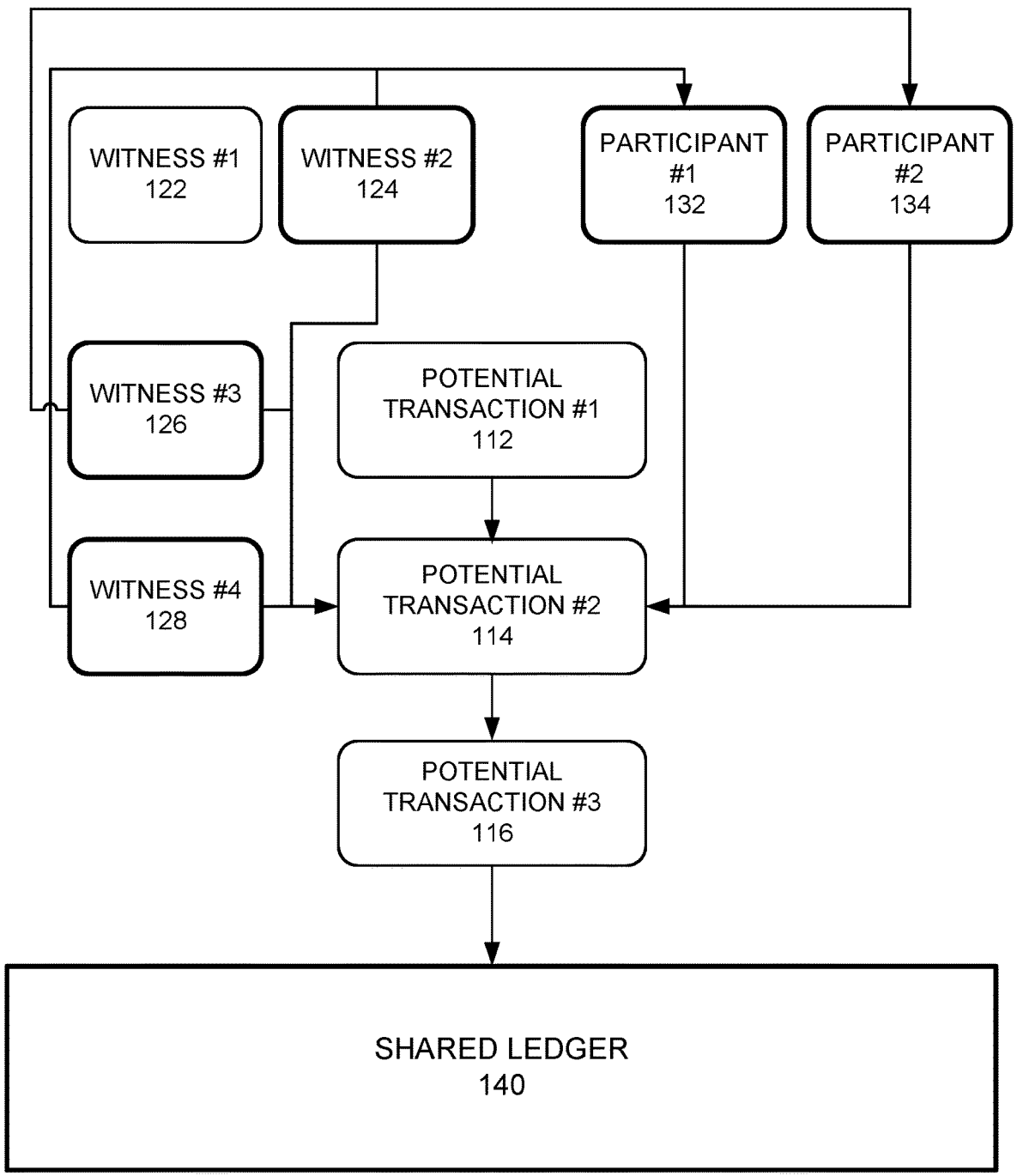
FIG. 1B illustrates a first shared ledger logic diagram of managing witness and participant assignments to another transaction in a shared ledger according to example embodiments.

FIG. 1B illustrates a first shared ledger logic diagram of managing witness and participant assignments to another transaction in a shared ledger according to example embodiments. Referring to FIG. 1B, the logic block diagram example 150 includes another example where the second transaction 114 yields a different assignment result than the first transaction. For example, in this scenario, the second transaction has three witnesses 124, 126 and 128 and two participants 132 and 134. In this example, the first witness is not assigned to any of the participants however the witness #4 128 and witness #3 126 are assigned to participant #1 132. The changes in FIG. 1B from the example in FIG. 1A include a new witness not previously used and a former witness who is not used. The changes may be based on the type of transaction (i.e., threshold dollar amount, type of merchandise, countries involved in the transaction, history of participants, etc.). The changes may also be based on a random number assignment that selects certain witnesses from a pool of witnesses to assign to the designated participants to ensure arbitrary arrangements and logged assignments which cannot be easily faked or enabled by fraudulent users. One approach to ensuring that the witness assignments are robust may include, for any given time interval (T) during which a number of potential shared ledger transactions are completed, no single, or, finite number of network nodes is required to witness all the transactions.

A time interval may be used to ensure one or more transactions are processed and witnessed at a particular time. The time interval may be just long enough for all witnesses to provide confirmation messages that the potential shared ledger transaction is valid so that it can be completed and stored in the shared ledger. With a time constraint, any witness may witness all transactions in that time interval but not beyond that time period as the witnesses may be dynamically reassigned at the end of the time period. Typically, re-assignment of witnesses would occur after multiple transactions have been conducted. This may include witness reassignment for a particular type of transaction and/or witnesses being reassigned to different participants at the end of a fixed interval of time. This approach to dynamic witness reassignment is one possibility. However, for purposes of the present embodiments, the witness assignment is generally fixed for a particular participant. In another example, when there is a transaction between two parties the result is a union of their witnesses. As a result, only a subset of witnesses will be a party to each transaction. In the event where an example is identified by a first characteristics, 'A', then one set of witnesses (i.e., W1, W2, and W3) may be used and with participants who have a 'B' characteristic in their potential transaction, a different subset of witnesses may be used (i.e., W2, W3 and W4). This approach makes potential shared ledger transactions serialization increasingly robust.

In any transaction, there are members, participants and witnesses. Members can be participants in a transaction and/or may also be a witness to a transaction. A participant is a member which is engaged in a transaction. A witness is a member who witnesses a transaction. Each member may engage in a transaction with any other member. Each member has a record of their own transactions, and also of the transactions for which they were a witness. Each member is assigned a set of witnesses, which may be disjoint from those assigned to some other participant. The assignment can be random and dynamic. At the beginning of a transaction, each participant selects a set of witnesses which is a subset of the set he was assigned. The transaction is witnessed by the union of the selected witnesses from each participant. The witnesses exchange cryptographically signed messages with other witnesses and with the participants so that they ensure all witnesses have knowledge of other witnesses assigned to the transaction having seen the same transaction. Each participant ensures that an initiated transaction will not interfere with other uncompleted transactions in which that same participant is engaged. A set of transactions is denoted as 'serializable' if the result of the transactions is equivalent to the transactions being processed in some serial order.

The management of shared ledger transactions may be analogous to the generalization of a standard database and/or distributed versions. Permitting better scaling with at least the same resistance to tampering is an ongoing challenge. Shared ledgers, of course, are distributed in the sense that many participants can validate whether what was added to the shared ledger is legitimate, but they are inherently serialized in the sense that only one participant can add transactions at a time. Rather than a single shared ledger, a structure may be considered where a shared ledger represents the transactions a single user U(i) or a set of users, with interactions represented by links between such chains. Rather than having a single machine at a given time assign the order of transactions, a mechanism that is analogous to transaction processing permits multiple concurrent transactions. Transactions are then not serialized, but are serializable as in a distributed database. Witness assignment may be performed using a random number, via a process of Byzantine selection which is resistant to tampering by a given number of adversaries.

Some basic properties and definitions for the customized shared ledger may include confidence that any entry in the ledger was in fact agreed to by whoever supposedly agreed to the entry. For example, if some party agreed to an entry and has attempted to enter the entry/transaction than someone cannot fake having agreed to something earlier than they did and all parties authorized to view an entry eventually will see the same entries. To achieve such requirements implies the following features: all messages are cryptographically signed, and the communication protocol either guarantees delivery or notifies of failure. A message may be forwarded, or the forwarder may simply send a proof of receipt, or affidavit, which includes a hash of the message, which is cryptographically signed by the forwarder. In this example, it is assumed that there are N participants U(i) for i=1 . . . N, which may act as a witness. The transaction is as an agreed on and witnessed set of actions involving some nonzero number of participants. A few examples include an offer to sell a security at a given price. Here there is only one participant. An acceptance of the offer by another participant, if accepted by the offeror, this becomes a transaction between two participants, and an acceptance of the offer by more than one participant. If accepted, this may become a transaction by the offeror and the joint acceptors, or just the offeror and a single acceptor as in second example. Any transaction recorded is complete. As a result, each participant has knowledge of and agrees to the transaction, has produced a cryptographic signature, and the transaction has been fully witnessed. A fully witnessed transaction, T, has been witnessed by each of a set of assigned witnesses wk(i), for some 'k' and each witness has a copy of the transaction, the identity of the other members of the witness set for this transaction, and a cryptographically signed proof from each other witness in the set that they have seen the same transaction. The use of 'k' enables multiple sets of assigned witnesses and this is important for fault tolerance. The transaction 'i' is placed in the ledger, the value of 'k' is used for the actual witnessing that took place. Usually 'k' can be elided as it is obvious from the context.

Full witnessing ensures that all witness copies in the ledger are identical, as opposed to, for example, having only a majority agree. This approach also can be arduous to implement with a large number of witnesses, and ensures that only a small enough number is needed so that at least one survives. Only a single surviving witness is in principle required to show the transaction and that all initial witnesses agreed on the contents. Rather than having all participants act as a witness to each transaction, at least one set W(i) is assigned to each participant U(i). The witnesses to a transaction between some set of participants are then the union of their sets of witnesses. That is, the witnesses to a transaction between users U(i) and U(j) are union of the witness sets W(i) and W(j). The sequence of transactions by each user might be gathered into a sequence of blocks, where each block, for example, might acknowledge which witnesses participated in the full witnessing. As an aside, we note the similarity between the state of the set of witnesses that view such an acknowledgement, and the notion of common knowledge between those witnesses of the related transactions. That is, each witness receiving the block has knowledge that the other witnesses viewed the same transactions, and that witness knows that the other witnesses know etc.

The communication protocols, the communication topology, and the related complexity of the interaction between the transaction participants and their witnesses are now disclosed. Note, that it is possible to fairly select multiple sets of possible witnesses. For example, one could say that any three out of a set of four witnesses are sufficient. That would be 3C4 possible sets of full witnesses. In this way, one can be robust if some witnesses are lost. However, if there are many possible sets of witnesses there is a greater chance that they are all colluding 'crooks' and that may motivate increasing the number or witnesses required. In the example formulation, multiple concurrent transactions are permitted which involve the shared distributed ledger. This may be performed by a distributed database. In order to avoid conflicts between transactions, and ensure consistency, a concurrency control protocol may be used. A standard protocol in distributed databases uses a two-phase commit approach. Here, quantities are subject to change by a transaction and are assigned locks. Then, preceding the transaction, all relevant locks are provided to the transaction, the transaction is performed, and after completion, the locks are released. The well-known result is that the resulting sequence of transactions is serializable. In other words, some serial order exists in which the transactions could have been performed producing the same result. The locks may be burdensome, and thus in an alternative approach, we first assume that each user or participant controls a set of quantities disjoint from other participants. Next, it is required that each participant has only one transaction active at any given time. This then produces a result equivalent to a two-phase commit. The proof is trivial, as having just one transaction active is equivalent to locking the quantities associated with the transaction. However, it might be required to have transactions which are persistent, for example, an offer to sell some goods at a stated price. Here the equivalence of locks may be needed. The assumption that each participant controls quantities disjoint from those of other participants permits each user to check for conflicts in its own sequence of transactions as opposed to a standard distributed database where remote locking is required.

As for a witnessing protocol, suppose there are 'p' participants and 'w' witnesses. Suppose a transaction has been concluded. Full witnessing requires that each participant and each witness view the transaction, and that each confirm that what they viewed is the same that the other (p+w−1) entities viewed. Each participant has a signed agreement with the others, but must confirm that the 'w' witnesses all witnessed the agreement. This requires (p×w) messages or proofs of receipt as discussed above. Each of the 'w' witnesses views the agreement, plus 'w' proofs of receipt, for a total of (w+1)×(w) messages. Thus, after an agreement is reached, there will be a need to convey (p×w)+w+w2 items, or w(p+1)+(w2) items. In the following example, a message can be combined via the network to substitute a linear number of combined messages for the quadratic. This may be performed by using a virtual network to connect the witnesses and participants, such that messages M(i) can be combined with an affidavit, then forwarded.

Figure 2:
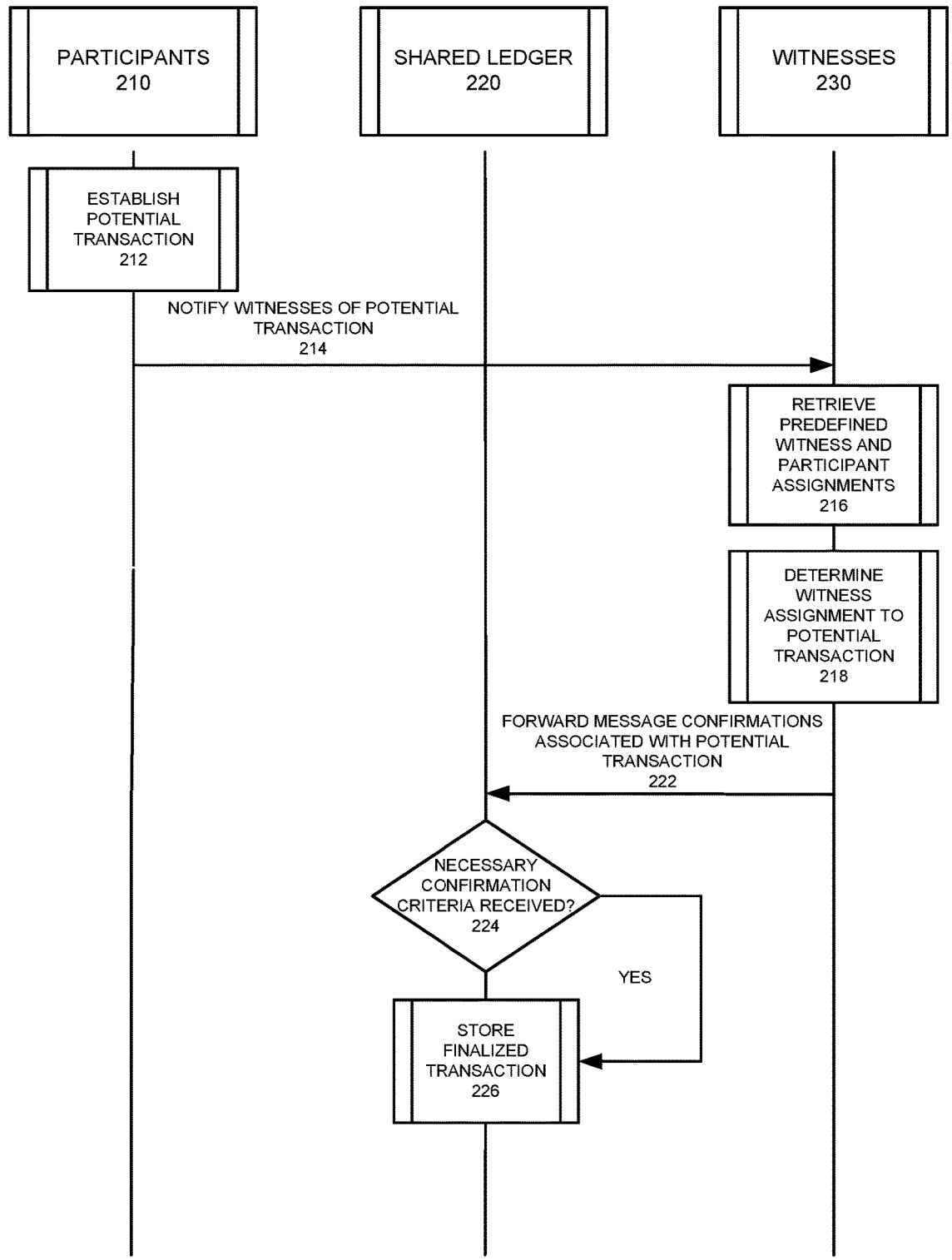
FIG. 2 illustrates a system signaling diagram of participant and witness assignment to shared ledger transactions according to example embodiments.

FIG. 2 illustrates a system signaling diagram of participant and witness assignment to shared ledger transactions according to example embodiments. Referring to FIG. 2, in a fundamental example 200, the participants 210 and the witnesses 230 may be separate parties which are part of a particular shared ledger transaction. For example, the participants 210 may be the initiators of a potential transaction 212 and may cause a trigger to occur which invokes the witnesses 230 to witness the transaction so it may be finalized and stored on the shared ledger 220. The witnesses are notified of the potential transaction 214 and the witnesses or the manager can then retrieve information pertaining to which witness is assigned to which participant/transaction based on known criteria 216. The witness assignment can be determined and shared and utilized with the potential transaction 218. Message confirmations may be forwarded 222 to the manager of the transaction and the necessary criteria can be used to identify whether the correct number of messages have been received needed to finalize the transaction. If so 224, the transaction may be stored and finalized in the shared ledger 226 along with participant and witness information identifying those parties to the transaction.

Figure 3A:
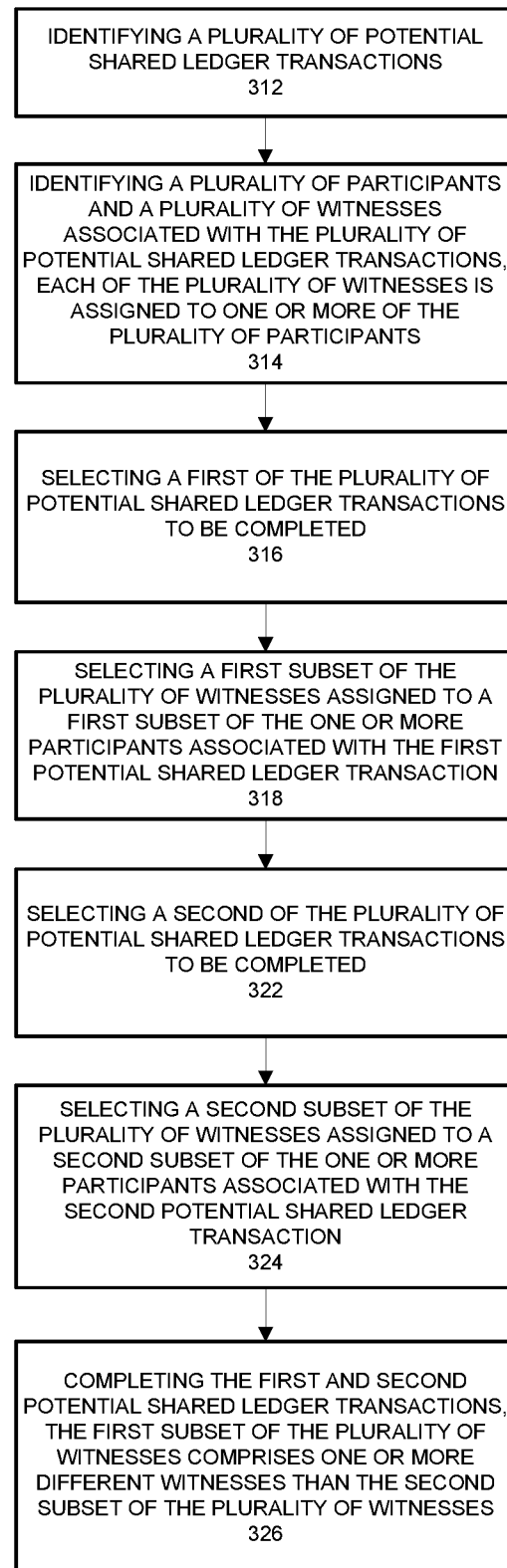
FIG. 3A illustrates a flow diagram of an example method of witness and participant assignment in the shared ledger according to example embodiments.

FIG. 3A illustrates a flow diagram of an example method of witness and participant assignment shared ledger according to example embodiments. Referring to FIG. 3, the method 300 may include identifying a plurality of potential shared ledger transactions 312, identifying a plurality of participants and a plurality of witnesses associated with the plurality of potential shared ledger transactions, such that each of the plurality of witnesses is assigned to one or more of the plurality of participants 314, selecting a first of the plurality of potential shared ledger transactions to be completed 316, selecting a first subset of the plurality of witnesses assigned to a first subset of the one or more participants associated with the first potential shared ledger transaction 318, selecting a second of the plurality of potential shared ledger transactions to be completed 322, selecting a second subset of the plurality of witnesses assigned to a second subset of the one or more participants associated with the second potential shared ledger transaction 324 and completing the first and second potential shared ledger transactions, where the first subset of the plurality of witnesses comprises one or more different witnesses than the second subset of the plurality of witnesses 326.

The method may also include receiving confirmation messages from one or more of the first subset of the plurality of witnesses, establishing a time threshold to complete the first potential shared ledger transaction, determining whether the confirmation messages have been received from all of the first subset of the plurality of witnesses prior to the time threshold expiring and whether to complete the first potential shared ledger transaction, requiring each of the first subset of witnesses to confirm the first potential shared ledger transaction as a completed shared ledger transaction by signing the completed first transaction and signing a time stamp associated with compliance of the time threshold. The method may further include receiving the confirmation messages from all the first subset of witnesses prior to the time threshold expiring, and completing the first potential shared ledger transaction based on the assigned one or more participants and the assigned first subset of witnesses. The method may further provide once the time threshold has expired, determining only a portion of the confirmation messages were received from a portion of the first subset of witnesses, and cancelling the potential shared ledger transaction responsive to determining only a portion of the confirmation messages were received. The first subset of witnesses is equal to or less than a number of the plurality of potential shared ledger transactions. The method may also include assigning the first subset of witnesses to one or more of a subset of the one or more participants and a specific type of transaction among the plurality of potential shared ledger transactions, and verifying that there is a threshold number proof of receipts for the first shared ledger transaction, and the threshold number proof of receipts is equal to a number of the one or more participants to the first potential shared ledger transaction multiplied by a number of the first subset of witnesses to the first potential shared ledger transaction. The method may also include queuing the plurality of shared ledger transactions, determining whether inventory of a product included in a first of the plurality of shared ledger transactions in the queue conflicts with any other of the plurality of shared ledger transactions, and completing the first shared ledger transaction when the inventory of the product is not in conflict with any other of the plurality of potential shared ledger transactions. One or more of the plurality of potential shared ledger transactions in the queue has a different assigned subset of witnesses than one or more of the remaining plurality of potential shared ledger transactions, and one or more of the plurality of potential shared ledger transactions share one or more of witnesses with one or more of the remaining plurality of potential shared ledger transactions.

Transactions include participants and witnesses as parties to the transactions. Each participant has an assigned set of witnesses which is a subset of the overall available witnesses. In one example, when two or more participants wish to enter into a transaction, those participants may agree on the particular subset of witnesses from the pool of available witnesses. The witnesses available to the transaction are a union of the first participant assigned witnesses (i.e., subset 1) and the second participant assigned witnesses (i.e., subset 2). Once the transaction has been approved and finalized, the transaction is entered into the ledgers linked to the participants, which may be separate for each participant. The notion of union between the various participants assumes that at least one of the witnesses of subset 1 are union with at least one of the witnesses of subset 2.

According to one example, among the members, participants and witnesses to shared ledger types of transactions, members can be participants in a transaction and/or a witness to a transaction. A participant is a member who is engaged in a current transaction. A witness is a member who witnesses a transaction. Each member may engage in a transaction with any other member. Each member has a record of their own transactions, and also of the transactions for which he or she has been a witness. Each member is assigned a set of witnesses, which may be disjoint from those assigned to some other participant(s). At the beginning of a transaction, each participant selects a set of witnesses which is a subset of the set originally assigned to that participant. A subset may be identified as a number that is equal to or less than a reference number, such as an original number of witnesses, a pool of witnesses, etc. In general, the examples discussed refer to a subset as a number that is less than the original number to which it is referencing. Each participant's transactions are stored in a subset of the shared ledger which may be disjoint from one or more other participant's subset.

The transaction is witnessed by a union of the selected witnesses from each of the participants. The witnesses exchange cryptographically signed messages with other witnesses and with the participants so that they ensure that all witnesses know that other witnesses assigned to this transaction have seen the same transaction. Each participant ensures that an initiated transaction will not interfere with other uncompleted transactions in which that particular participant is engaged (i.e., limited quantities of goods).

A single distributed ledger may be contrasted with a pair of ledgers with banks between them. In a pair of ledgers there might be two cryptocurrencies (e.g., BITCOIN) and it is possible to access an online bank and exchange the cryptocurrencies. Transactions in one crypto-currency are independent of those in the other crypto-currency and have a different sets of observers. However, there is no single transaction that exchanges one crypto-currency for the other crypto-currency. Enabling a single transaction would require the transaction pair be part of a same ledger. In actuality, with one transaction, a customer may transfer to the bank some amount of one crypto-currency and in a later transaction receive some amount of the other currency. In practice, if the bank were to go out of business between the two transactions, the customer would not receive the money they were owed. Thus, there are no transactions between the two crypto-currencies involving the same resources and there is also no single distributed ledger even though the banks provide bridges between the ledgers.

In one example embodiment, a single distributed ledger configuration may be used for recording transactions between any subset of a collection of participants. The witnesses to transactions are assigned such that each assignment consists of a set of witnesses or observers which represents a subset of a total set of available witnesses acting as observers, and the assignment to different transactions occurring in any given time interval may be different. The observers to a transaction communicate to ensure that they have witnessed the same transaction in an effort to verify that transaction. Also, the witnesses are assigned to transactions using a random number witness assignment. The transactions are serializable but are not serialized at any particular time. Witnesses are assigned to parties to the transaction. The data regarding disjoint transactions is stored in disjoint locations. A participant to a transaction is a party that owns a resource that is changed (e.g., exchanged for another resource) in the transaction. A witness to a transaction is someone who certifies that they have observed the transaction. An observer is either a witness or someone else who participates in the handling of the transaction such that the transaction cannot be completed without them. A distributed ledger is a single system if there is no partitioning of the parties into disjoint sets such that parties only have transactions with parties in their own partition, and the resources into disjoint sets so that no transaction involves resources in different sets, and the observers into disjoint sets so that no transaction has observers from different sets.

Another example embodiment may include a shared ledger system for recording transactions between any subset of a collection of participants, where witnesses to transactions are assigned such that each assignment includes a set of witnesses which is a subset of a total set of witnesses, and the assignment to different concurrent transactions may be different. The witnesses communicate to ensure that they have witnessed the same transaction. If a partition was sought, a separate distributed ledger would be required for each combination of participants. Also, witnesses are assigned to participants, such that any two participants may have different witnesses and where the witnesses to a transaction are a union of subsets of the witnesses assigned to the participants in the transaction. The shared ledger may be used for recording transactions between any subset of a collection of participants, where witnesses to transactions are assigned such that each assignment includes a set of witnesses which is a subset of a total set of witnesses, and where the witnesses to a transaction are a union of subsets of the witnesses assigned to the participants in the transaction and where the witnesses communicate to ensure that they have witnessed the same transaction they were assigned to witness.

A distributed ledger is a single system if there is no partitioning of the parties into disjoint sets such that parties only have transactions with parties in their own partition, or the resources into disjoint sets so that no transaction deals with resources in different sets or the observers into disjoint sets so that no transaction has observers from different sets, or the records for different resources stored in disjoint physical or logical locations.

Figure 3B:
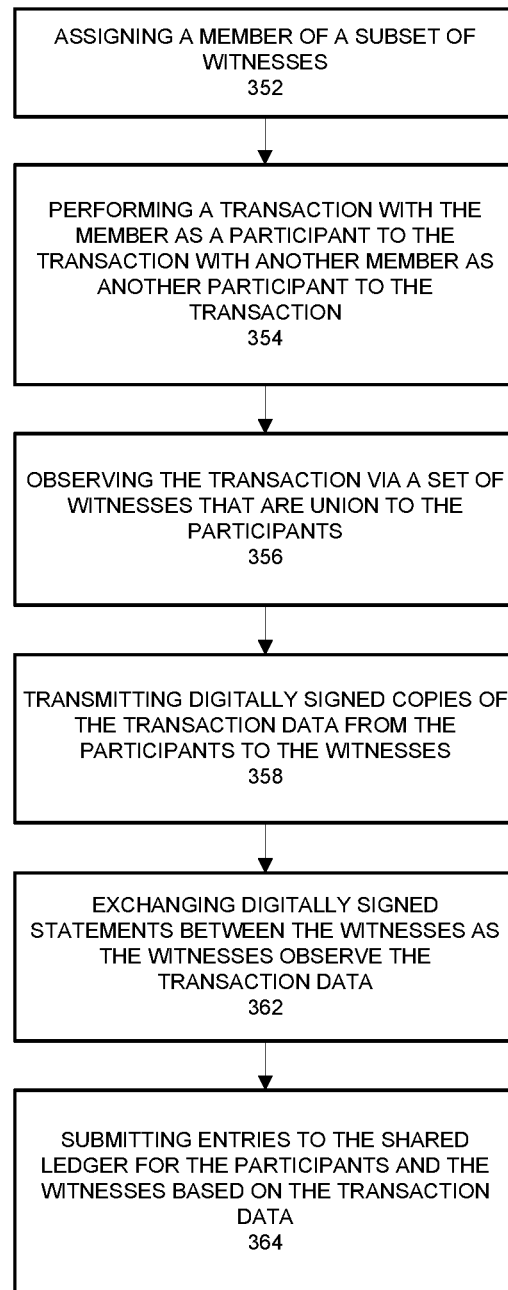
FIG. 3B illustrates another flow diagram of an example method of witness and participant actions during a transaction according to example embodiments.

FIG. 3B illustrates another flow diagram 350 of an example method of witness and participant actions during a transaction according to example embodiments. Referring to FIG. 3B, a member is assigned a set of witnesses 352, then the member may engage as a participant in a transaction with another member 354. The set of witnesses that is the union of the two participants' witnesses observes the transaction 356. Each participant transmits to all the witnesses, digitally signed copies of what is performed in the transaction 358. The witnesses exchange digitally signed statements when they've seen parts of the transaction 362. Lastly, entries are submitted to the shared ledger for the participants and the witnesses based on the transaction data 364.

In general, there are multiple witness sets or subsets of the total witnesses. There are also multiple and separate subsets of the distributed ledger. Thus multiple entries can be effected simultaneously, with potentially different witness sets. Then as a result there is no single point of control or bottleneck, which provides scaling. In one example, if participants A and B have a transaction, and separately C and D, the two transactions can proceed simultaneously, witnessed by possibly disjoint sets of witnesses. Moreover the part of the distributed ledger where the A-B transaction is recorded may be completely separate from that which records the C-D transaction. The part of the ledger where transactions involving A are recorded is associated with A, and those for B associated with B etc. But any subset of participants may perform a transaction, stored in the distributed ledger.

Figure 3C:
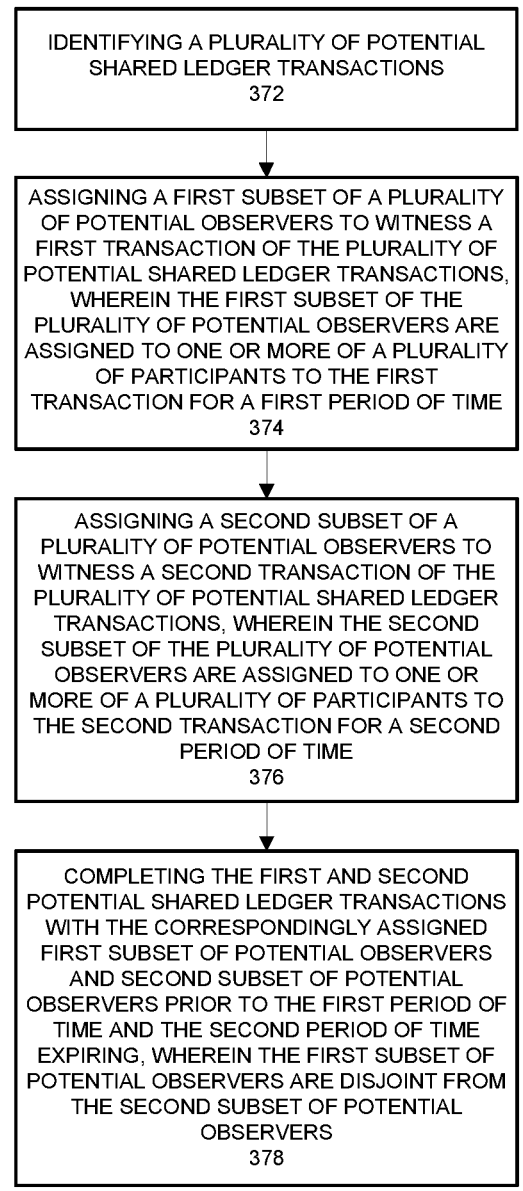
FIG. 3C illustrates another flow diagram of an example method of witness and participant actions during a transaction according to example embodiments.

FIG. 3C illustrates another flow diagram 370 of an example method of witness and participant actions during a transaction according to example embodiments. Referring to FIG. 3C, the example method 370 may include identifying a plurality of potential shared ledger transactions 372, assigning a first subset of a plurality of potential observers to witness a first transaction of the plurality of potential shared ledger transactions, wherein the first subset of the plurality of potential observers are assigned to one or more of a plurality of participants to the first transaction for a first period of time 374, and assigning a second subset of the plurality of potential observers to witness a second transaction of the plurality of potential shared ledger transactions, wherein the second subset of the plurality of potential observers are assigned to one or more of a plurality of participants to the second transaction for a second period of time 376, and completing the first and second potential shared ledger transactions with the correspondingly assigned first subset of potential observers and second subset of potential observers prior to the first period of time and the second period of time expiring, wherein the first subset of potential observers are disjoint from the second subset of potential observers 378. The example method may also include receiving confirmation messages from one or more of the first subset of the plurality of observers, establishing a time threshold to complete the first potential shared ledger transaction, determining whether the confirmation messages have been received from all of the first subset of the plurality of observers prior to the time threshold expiring and whether to complete the first potential shared ledger transaction and requiring each of the first subset of observers to confirm the first potential shared ledger transaction as a completed shared ledger transaction by signing the completed first transaction and signing a time stamp associated with compliance of the time threshold.

The method may further include receiving the confirmation messages from all the first subset of observers prior to the time threshold expiring, and completing the first potential shared ledger transaction based on the assigned one or more participants and the assigned first subset of observers. The method may also include, once the time threshold has expired, determining only a portion of the confirmation messages were received from a portion of the first subset of observers, and cancelling the potential shared ledger transaction responsive to determining only a portion of the confirmation messages were received. A number of the first subset of observers may be equal to or less than a number of the plurality of potential shared ledger transactions. The method may also include assigning the first subset of observers to one or more of a subset of the one or more participants and a specific type of transaction among the plurality of potential shared ledger transactions, and verifying that there is a threshold number proof of receipts for the first shared ledger transaction, wherein the threshold number proof of receipts is equal to a number of the one or more participants to the first potential shared ledger transaction multiplied by a number of the first subset of observers to the first potential shared ledger transaction. The method may also provide queuing the plurality of shared ledger transactions, determining whether inventory of a product included in a first of the plurality of shared ledger transactions in the queue conflicts with any other of the plurality of shared ledger transactions, and completing the first shared ledger transaction when the inventory of the product is not in conflict with any other of the plurality of potential shared ledger transactions. Also, one or more of the plurality of potential shared ledger transactions in the queue has a different assigned subset of observers than one or more of the remaining plurality of potential shared ledger transactions, and one or more of the plurality of potential shared ledger transactions share one or more of observers with one or more of the remaining plurality of potential shared ledger transactions. The method may further include completing the first and second transactions simultaneously when the one or more participants associated with the first potential transaction are different from the one or more participants associated with the second potential transaction. Also, at least one of the first subset of the plurality of observers assigned to the first subset of the one or more participants are union with at least one of the observers from the second subset of the plurality of observers assigned to the second subset of the one or more participants. Additionally, one or more of the first subset of the plurality of observers and the second subset of the plurality of observers are assigned to one or more of the plurality of observers and one or more of the potential shared ledger transactions based on a random number. The random number may be selected by any of the examples provided, however, the random number may be required to be generated by a third party such that each of the participants agree to that third party selected to provide the random number for selection purposes.

According to example embodiments, certain basic information may be used to established assignments of witnesses/observers to one or more transactions. In operation, there are non-overlapping assignments of observers even when that information does not change. For example, with respect to the Liskov substitution principle when a new time interval occurs, certain elements of the basic information may need to be changed to determine a next order of the assignments. Some of that information is based on time or a clock and that is what causes a non-overlapping assignment from one time interval to the next. In one example, for any time interval there can be two transactions occurring and being witnessed via disjoint observers. In fact, most transactions will have disjoint observers. If the time interval is short and it does not cover a leader transition from a previously assigned leader then all transactions that follows the Liskov principle will have the same leader as well. Two transactions between the same set of participants will have overlapping observers/witnesses.

Figure 3D:
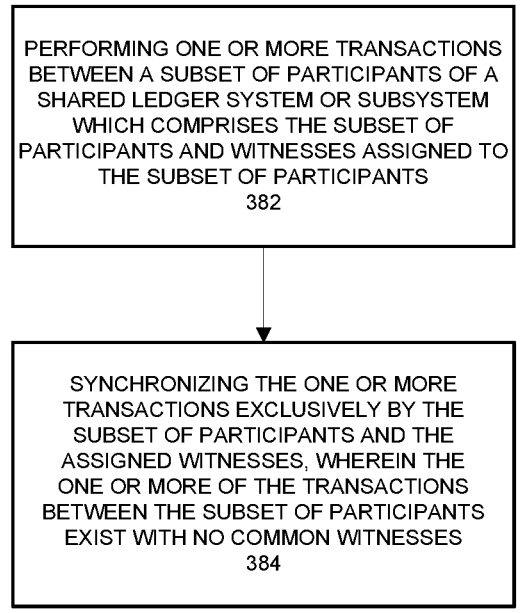
FIG. 3D illustrates another flow diagram of an example method of witness and participant actions during a transaction according to example embodiments.

FIG. 3D illustrates another flow diagram of an example method 380 of witness and participant actions during a transaction according to example embodiments. Referring to FIG. 3D, the method may include performing one or more transactions between a subset of participants of a shared ledger system or subsystem which comprises the subset of participants and witnesses assigned to the subset of participants 382, and synchronizing the one or more transactions exclusively by the subset of participants and the assigned witnesses, the one or more of the transactions between the subset of participants exist with no common witnesses 384.

Figure 4:
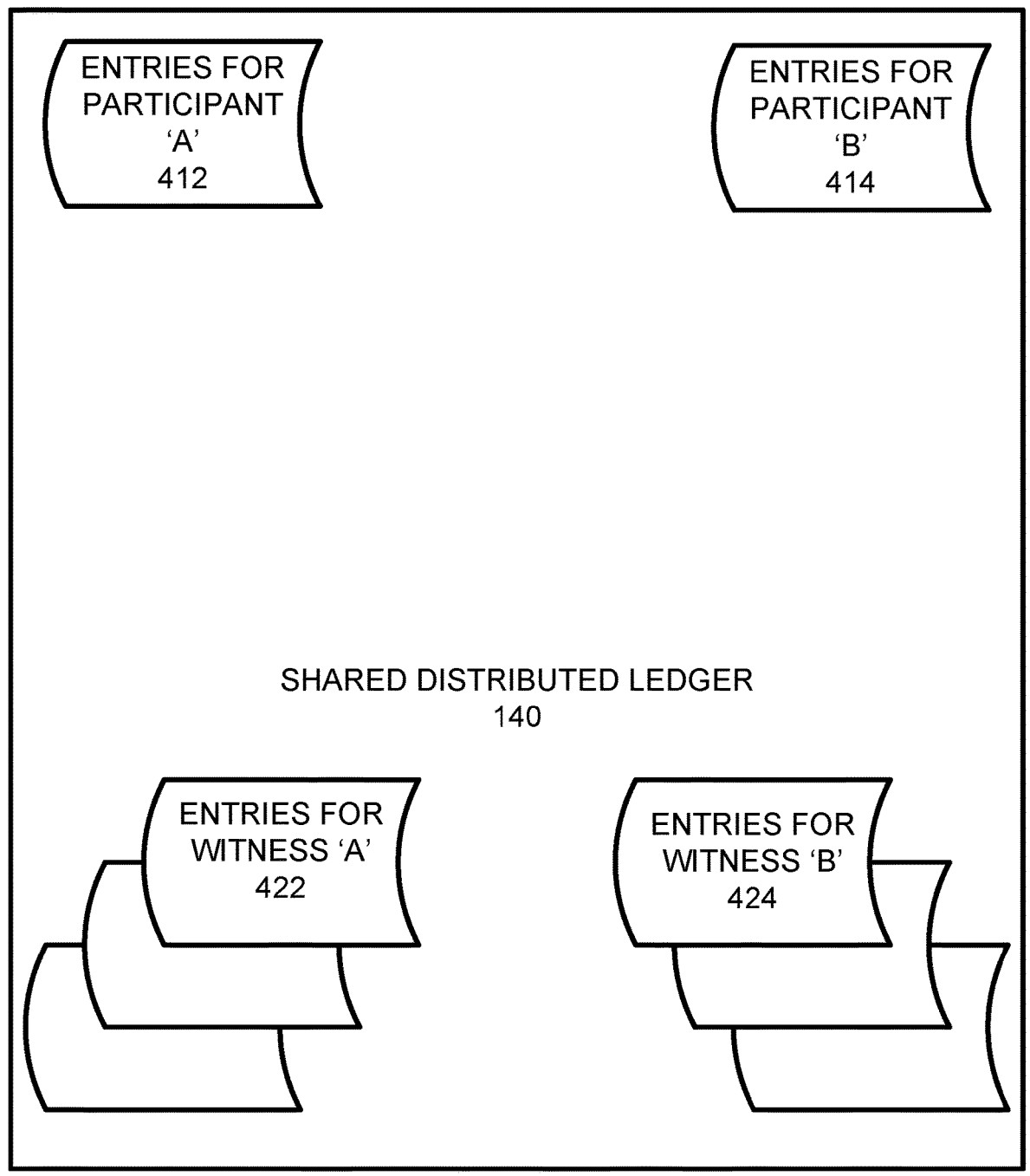
FIG. 4 illustrates an example shared distributed ledger with inputs from participants and witnesses to one or more transactions where each witness and each participant may write to different parts of the ledger so entries can be made simultaneously according to example embodiments.

FIG. 4 illustrates an example shared ledger configuration 400 according to example embodiments. Referring to FIG. 4, the shared ledger 140 includes entries from all parties to a transaction. Each participants transactions (412 for A and 414 for B) are stored in a subset of the shared ledger which may be disjoint from one or more of the other participants' subset of the shared ledger. Entries in the shared ledger for each participant and/or witness 422 and 424 may be physically separate.

According to another example embodiment, random number selection may be used to select and assign witnesses to participants for a transaction. At initiation of a transaction, there are a set of participants and a set of witnesses, with a total of N participants and M witnesses. Some participants may also be witnesses. Each participant is assigned a set of witnesses, selected via a randomized process so that no participant can influence this selection. This ensures it will be difficult for the participants to collude with the witnesses to carry out some private purpose. Witnesses W(I) and participants P(J) are numbered, from 0 to N−1 and 1 to M, respectively. A hash function 'H' may also be selected. The value for Q>=2 witnesses is assigned to each participant via the following process. First, a fair random number is selected which may be obtained via an algorithm, or, for example, via a public number such as the number of shares traded on the NY stock exchange in the previous trading session), denoted by F. Next, H (J times F) is computed for each J, and where J is set from 1 to N. We then sort the answers, thus obtaining a complete ordering of the witnesses. If there are tie values, the ties are broken by hashing the colliding numbers J multiplied by (F plus q), for q=1, 2 . . . until the tie is broken. The new order of witnesses is denoted by W(J*) . . . J*=1, 2, . . . M. N sets of witnesses are then obtained by assigning Q witnesses in the new order to the P(I), 0=1, 2 . . . N−1, as follows. The witnesses for P(I) are W(J*), for J*={Q times I+[1, 2, . . . Q]}Mod(M). If a participant is assigned itself as a witness, the witness is elided from its witness set.

In one example, suppose a cryptographic quality hash function is performed, such as SHA-2, then the jth witnesses for the ith participant are identified as H(r, i, j) where the values of r, i and j can be concatenated. If a universal class of hash functions is being used then r becomes the index into the class and i and j are hashed. This approach has the potential for some witnesses to be called more often than what is fair. Each witness that's selected by a hash function can then be asked if they are willing to be a witness, and a statement from them about how many members they are already being a witness for may be received as an "excuse". Suppose the jth witness is busy then the hash function can be used to compute H(r, i, j, 1). If that witness is busy then the process could go to H(r, i, j, 2), etc. The collision avoidance can be performed in a distributed scalable manner.

A random number is a number where there is a methodology for creating that number, or numbers, that is agreed upon by the members and where no member has a significant way to influence the value of the number. For example, numbers such as a daily number corresponding to the last few digits of NYSE stock volume may be unpredictable or random prior to their existence. One can imagine some astronomical or seismic process that is available to all the members so that they can verify the value of that number. Another example may be the daily lottery numbers. Permitting the members to the transaction select a number is still a realistic approach. The random number may be agreed upon by the participants and members so it can be used to select a subset of witnesses.

In general, randomly selected witnesses enable non-participants to trust that a transaction is valid. For example, a participant to a transaction pretending to sell a chocolate bar and engaging in a transaction, but actually keeping the chocolate bar and at the same time effectively cloning out of thin air a chocolate bar, so if parties are colluding then they have just doubled their supply of chocolate bars by cheating others and not intending to ship their alleged product. The availability of a shared and trusted source of entropy can be used in distributed algorithms to optimize the execution of tasks which would otherwise require an explicit agreement. Obtaining an agreement on a distributed system can be expensive as most practical algorithms have a super linear cost increase in the number of participants. In practice when a central source of trust is not available, a shared entropy source can be obtained by distributed generation of a fair random number.

In the following, a random number can be selected in a manner which resists collusion. Given a random number, a complete random order of the participants can be achieved, which can then be partitioned into subsets simply by selecting members in this order. This order can then be used to determine the connectivity in resulting ring configurations (see FIG. 6). The random number can also be used for purposes of fairness in processing a sequence of transactions.

A random number reached by agreement can be used to order the virtual interconnection network, or determine the order of transaction processing in some application. In relation to this, a question arises of how such a number can be picked which cannot be influenced by some number of participants. Suppose N participants wish to jointly select a random number. One possibility is for each to pick one, then do an X-OR of the collection. A concern with this approach is that some number of the participants may elect to wait until they see at least N−r+1 of the others before submitting their input, with their submission selected for some nefarious purpose. Two types of algorithms for addressing this concern are the encoded hiding and the ring algorithm.

The encoded hiding algorithm provides that of the N participants, each selects a random number, which they encrypt with an agreed on approach. After the resulting encoded numbers are disseminated, the encryption keys are revealed, thus revealing the random numbers. The decoded numbers are then X-ORed. This clearly provides substantial security, however, once N−1 of the numbers are revealed, an interfering node can select a key which provides some influence over the result, although total control of the final number would require computing a key with the desired value, equivalent to breaking the code. One scenario may include a group of N individuals communicating through a computer network and generating a fair B-bit random number defined as a uniformly distributed integer number between 0 and $2^B-1$ independent from any source of information accessible to any subset of individual of cardinality R or less.

In order to perform this function, a procedure needs and a communication protocol must be established with the following requirements: 1) under normal operating circumstances each individual can establish with certainty that the number was fair, 2) if the number is fair, it can be accessed by all individuals in the group, 3) no individual has the right of rejecting the number based on an observation that is dependent on the final number (implied by fairness), there exists a value M such that an agreement between M participants that the number is fair, guarantees that the number is fair. As a result, the following result should include the participants agreeing that they want to generate a random number. This may be due to an individual requesting participation in the generation of a random number or an event and reaching a number of individuals and implying the need to generate a fair random number on account of a pre-agreed upon behavior.

With regard to shared ledger transactions, a participant is a member of a shared/distributed ledger which is a direct party to a transaction (i.e., buyer/seller). A witness is a member of the ledger whose functions include recording transactions, and in general communicating with other witnesses and participants, but not being a provider or recipient of transaction goods. A serializer is an entity which determines the order of execution of transactions of which it is not a participant, such as an assigned overseer or leader of transaction processing management efforts, which may be deemed a "leader" in a Liskov ordering model, or a miner in the BITCOIN model.

According to one example of shared ledger transactions, suppose there is no serialization of transactions performed by any of the witnesses. Then, the participants and witnesses for each transaction can make their own decisions regarding the validity and finalization of one or more transactions to which such entities participated. BITCOIN/LITECOIN and other crypto-currencies generally do not follow such an approach to transaction management, since each of those configurations performs serializations by leaders, which are not considered witnesses by the example embodiments.

According to example embodiments, references and examples are made to a single sub-system or single distributed ledger approach. This can be distinguished, for example, from two cryptocurrencies managed by a bank, because there are banks that permit the exchange of two cryptocurrencies already. In this example, two transactions have disjoint sets of observers, and witnesses and participants can be observers. Also, a serializer may be another entity or just another type (subset type) of observer. As a result, any entity performing serialization is by definition an observer.

Figure 5:
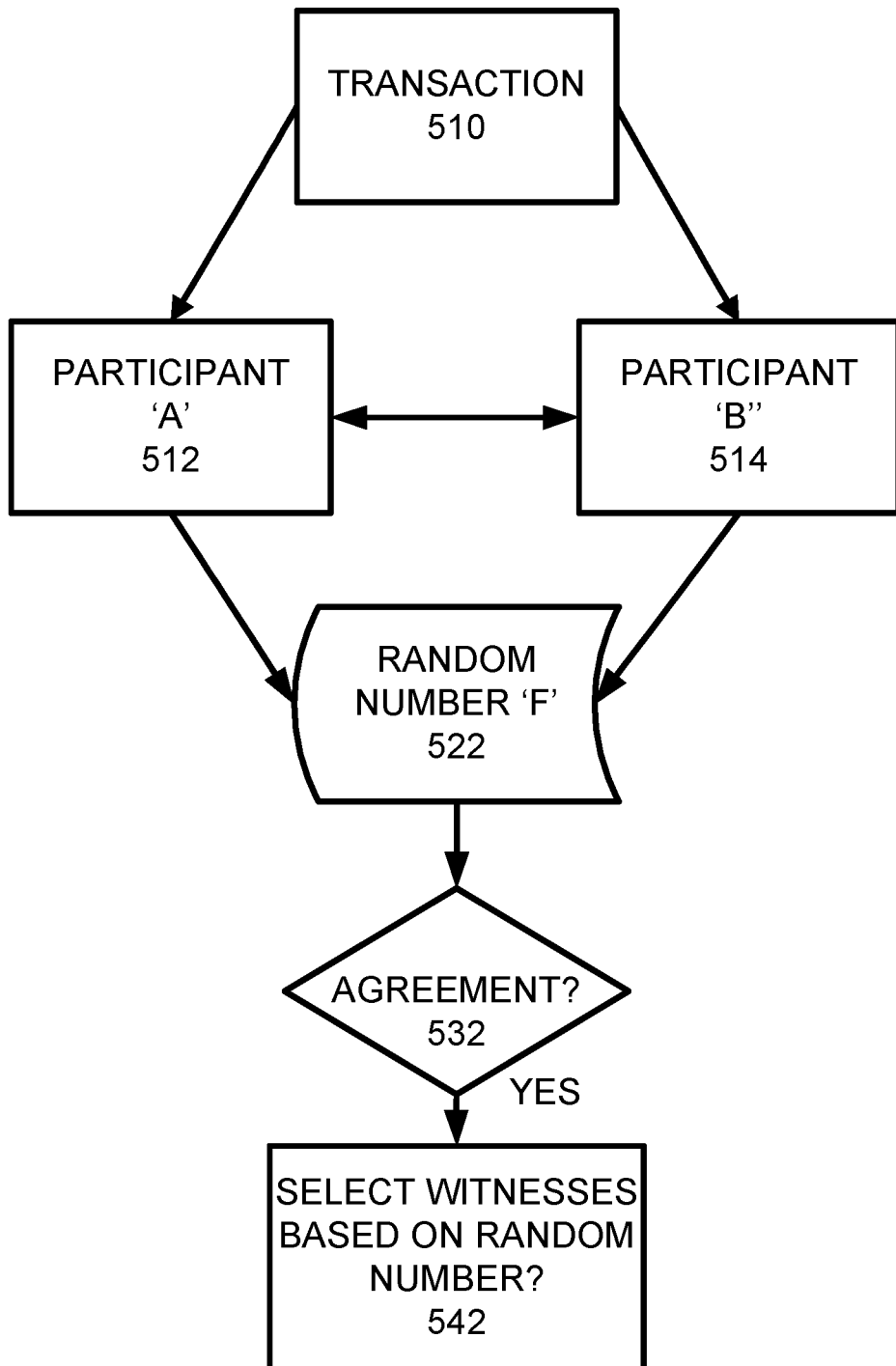
FIG. 5 illustrates a logic diagram of participants agreeing to a random number selection used to conduct a transaction according to example embodiments.

FIG. 5 illustrates a logic diagram of participants agreeing to a random number selection used to conduct a transaction according to example embodiments. Referring to FIG. 5, the logic diagram 500 includes a transaction 510 which is used as the basis for initiating a random number selection and agreement among the participants 512 and 514. The random number F 522 is a number that is agreed upon by the participants and which satisfies the contract terms which may be used to establish the random number. The agreement 532 may be required prior to proceeding with application of the random number to the transaction witness selection and other functions for selecting witnesses 542 and finalizing the transaction in the shared ledger.

In one example, an individual (participant) requests the generation of the random number. In general, the generation of a fair random number will be associated with a use of the random number. In some situations the use of the random number is decided before the random number is generated. This is performed to avoid rejection sampling on the part of individuals involved in the use of the random number. Participants may exchange data for the generation of the random number. Participants may also have access to the random number. Each participant that obtains access to the random number may have a high probability of the certainty that the random number is fair. The high probability is for attaining certainty and is not the probability that the number is in fact fair. Additionally, an agreement as to the validity of the number can be achieved. This implies that at least M individuals know with certainty that at least M individuals believe the number is fair.

In one example, the assumption is that $M=Floor(N/2)+1>N/2$, and at least M individuals in the group are honest (i.e., they will enact the prescribed algorithm). An example approach that has known flaws may include each participant exchanging with each participant a locally generated random number. The participants obtain the final shared random number by XORing the numbers. An attack on this algorithm would be a protocol attack in the event that one participant obtains access to all numbers before sharing their own number, then that participant can completely control the final random number by setting a desired outcome and XORing all other numbers with that number. This issue can be solved by ensuring that no participant can obtain access to all numbers before delivering ones own number, or, if the result happens otherwise, it can be discovered and agreed upon that the number was tampered.

Conveying to everyone a one way function of the number and only afterwards delivering the actual (verifiable) number to everyone may reduce the likelihood of tailoring of the number by any of the participants, but is subject to a rejection attack where the attacker can wait to deliver his or her own number until access to all other numbers is achieved, and compute if the number is favorable or otherwise simply refuse to deliver the number. This result rejects the sample and potentially influences the distribution of the outcome. The issue with this limited solution is that one can take back his or her number. This problem can be dealt with by using an approach similar to time-lock puzzles. Basically, if each participants' random number is delivered enclosed in a time-lock puzzle there will be a guarantee that the number cannot be used for a certain amount of time and that the number cannot be taken back as in the case of refusal of communicating the number after sharing the hash. An example may include each individual having a crypto-identity that can be used to sign data by verifying who delivered a message. For example, an individual 'P0' decides that the creation of a random number for a specific purpose is needed. P0 contacts each participant communicating the request to participate with the intended use and conditions. Each participant Pi marks down the local time and generates a random number Xi, using a local source of entropy, signs the time and the random number and delivers them to P0. Once P0 gathers all numbers and times and signatures, it conveys them back to each participant which checks the local time versus the original creation time of his or her number, and verifies the time is (much) less than the time T it takes to solve the time lock puzzle. Furthermore, it verifies all signatures and if the delta time is less than T, it generates a corresponding acknowledgement, signs it, and delivers it back to P0. Given the time lock puzzle cannot be solved in less than T, the participant has the certainty that the generation algorithm of the random number will yield a fair random number. P0 gathers the signed acknowledgements and propagates them to the users. All participants will have sufficient data to verify whether the random number should be accepted (e.g. accepted by the majority as probably fair. No participant can prevent the generation and use of the random number if a majority of members signed. P0 can wait and decide whether to skip verification if the number is unfavorable. However, if the random number is not used, each participant can contact directly all other participants and retrieve the signed acknowledgement and if a majority is gathered, it can be used to hold P0 accountable.

The time lock to control complexity for N users may provide that if each message is enclosed in a T time lock, then N time lock puzzles are needed to be solved. Since the design time T depends on factor, such as network latency, but not on N, the cost of computing the number would grow linearly with N. To avoid this issue, a time lock that operates on the set of numbers and not on each individual number is implemented. Let $H(\ldots)$ be a hash function with computation time provably lower bounded by t with $Nt \ll T$. The random number is computed as follows: sort $x\_0, \ldots, x\_\{N-1\}$ obtaining $s\_0 < s\_1 < \ldots < s\_\{N-1\}$, (the set is agreed to be rejected if 2 numbers are identical), $y\_\{0,0\}=H(s\_0)$, $y\_\{0,i\}=H(concat(y\_\{0,i-1\},s\_i))$, $y\_\{j,0\}=H(concat(y\_\{j-1,N-1\},s\_0))$, $y\_\{j,i\}=H(concat(y\_\{j,i-1\},s\_i))$. The random number is $X=y\_\{K-1,N-1\}$. To compute X it takes at least KNt seconds. In the worst case scenario, of all but one individuals improperly colluding, the minimum compute time for X is $((K-1)*N+1)t$, in the worst case where the honest individual produces the largest number $s\_\{N-1\}$ and is attainable by knowing beforehand $s\_0$ to $s\_\{N-2\}$ and precomputing $y\_\{0,N-2\}$. So, by choosing $K=Ceil((T/t-1)/N)$ we have a guarantee that no one can compute X in less than T but the actual complexity is constant with respect to N.

As an additional method, if the Hash function $H(\ldots)$ has the necessary property of not allowing forward computation speedup, if one knows the structure of the text to be hashed (i.e. the computation is not parallelizable), one may construct the data S_full to be hashed as K concatenations of $(s\_0, \ldots s\_\{N-1\})$ and have $X=H(S\_full)$. With respect to an algorithm on a Blockchain, variant 1, with time based locks a majority is required. A blockchain provides both a well-defined communication means and protocol, as well as a well-defined assurance that a participant who signed the transaction can be held accountable. A first mapping of the algorithm on a blockchain can be a contract that is drafted that requires the creation of a random number, such as a lottery contract. The initiator sends the contract for endorsement to the candidate participants. Each participant timestamps, creates a local random number and signs the data with the implication that if the number is found to be fair by a predefined majority then the contract is binding.

The initiator gathers signatures numbers and timestamps and forms a transaction that is submitted for inclusion in the ledger. Once the transaction is in the ledger, it cannot be revoked so each participant can see the transaction. If the transaction is received in the ledger before the expiration of the time lock, a participant can produce a self-signed transaction (only the participant's endorsement is required) and submit for inclusion in the ledger. The self-signed transactions constitute irrevocable votes for the validity of the original contract. Once a majority is found in the ledger, then the transaction is valid. This is followed by a transaction that points to the quorum votes and the original transaction with the time lock numbers that writes explicitly on the ledger the result of the lottery. This requires the solution of the time lock so a suitable incentive can be placed to encourage the submission of such a transaction. For instance, the first submitter of the transaction can be entitled to a fee-based reward. The initiator cannot attack this approach by withholding the initial transaction because by doing so will guarantee that the quorum will not be reached independently of the final number. This approach assumes that a majority of the peers is honest and executes the prescribed algorithm.

The following example relies on an assumption that physical time and block count can be bound, and lifts all assumptions on participant honesty (i.e., the allowed number of dishonest participants is N-1). With regard to the algorithm on a Blockchain, variant 2, block-based time locks assumes that in a blockchain there is guarantee that at least a new block is emitted every Tb seconds, and blocks in the chain are explicitly numbered, which can be made true trivially with no implications on the blockchain. Instead of specifying a time range of validity, a participant can specify a block range of validity based on their current view of the blockchain. This permits a self-contained distributed random number generator (RNG) in the blockchain, for instance, that it permits the validity of the generation transaction to be verified by anyone without further action from the participants.

In operation, an initiator contacts the participants. Each participant retrieves its current latest block number and decides on a block validity range for its own number using Tb as the upper bound for the time to generate a block. In particular, if it is observed that the current block (locally) is block 1000, and that the time lock will take T seconds to compute, the validity range for the number is between 1000 and 1000+T/Tb, rounded low. The transaction is then formed with all the numbers' validity ranges and signatures, and then submitted. Once the transaction is in the ledger, the verification for the validity of the transaction is trivially performed by checking that all ranges are met. This way, if even only one participant was honest, the validity for the honest participant is assured as a requirement and the resulting number is determined to be fair.

One example embodiment may include a method that provides identifying a potential transaction with N participants and M observers/witnesses, wherein N and M are both integers greater than one, randomly assigning a subset of the M witnesses to one or more of the N participants, and completing the potential transaction with the subset of witnesses as witnesses to the potential transaction. The fair number generation process may be considered a delayed divulgence scheme where the local numbers generated by the participants to a transaction are concealed or hidden for a first time interval but divulged and forwarded to other participants prior to expiration of a longer window of time (i.e., a second time interval that is longer than the first time interval). This process may use a time lock to produce such data, which in the future will result in a final number, once started, that final number will be revealed in the future and cannot be changed. In this example, the subset of M observers i s equal to or greater than two. The N participants may include two or more participants with each of the participants being assigned two or more of the M observers. In the randomly assigning of the subset of the M witnesses, a random number F is selected which includes a publicly available number. The process of randomly assigning a subset of the M witnesses may include determining a hash based on a random number and determining a new order of the M witnesses. The process may also include timestamping the transaction via each of the participants, creating the random number (i.e., final number) and signing transaction data, and when a random number is determined to be a fair random number by a predefined majority, then a contract associated with the transaction is deemed binding. The method may also provide timestamping the transaction via each of the participants and creating the final random number and signing the transaction data, and when a random number is determined to be a fair random number by a predefined majority, then a contract associated with the transaction is deemed binding.

The function of the local numbers generated by the set of participants (i.e., participants to the transaction, observers, or other parties to the transaction) that is used to create final numbers, could implement various procedures for using the locally created numbers to generate a final random number. For example, the local numbers could be added together and an average can be taken, the local numbers may be XOR-ed together, via an XOR operation, to generate a hash based on the random numbers. The local numbers are shared in a way that prevents each participant from accessing all of the local numbers at any one point in time. This also prevents generation of a final number before communicating one's own local number. By performing such a communication in a provable manner, permits the generation and a guarantee that the final number will be a 'fair' number provided at least one participant followed the instructions faithfully.

To achieve this result, a number of possible methods can be used. One approach is to perform partial incremental communication. This provides for each participant to generate and communicate its local number, in the clear, to a subset of the participants small enough to guarantee that all participants have communicated their local numbers while guaranteeing that no participant has received all the numbers. Another approach is concealing the local number with a time-lock puzzle. The local number may be communicated in a transformed form. For example, a concealed number is communicated and the corresponding local number can be obtained only by performing a specific amount of complex computations on the concealed number over a predetermined period of time (i.e., 100,000 hash operations, 60 seconds of hashing, etc.), such as the iterated computations of a cryptographically secure hash. Another approach ensures that the final number cannot be computed before revealing all local numbers by ensuring that the function to compute the final number from the local number is sufficiently processor intensive that it will take even an optimal computing device a guaranteed minimum amount of time to compute. Verifying that the number is fair may provide verifying that the local numbers were communicated within a certain amount of time that is less than a time required to compute the final number.

Other methodologies can be used to conceal local or final number as those skilled in the art can easily recognize. For example, time-lock puzzles can be used. The time lock operation may include, in general, an invertible transformation to the final number, for example, by computing the inverse and obtaining the original number(s) from the transformed number, may require an amount of computation that has a known and specified upper and lower bound. This permits a lower bound of the minimum amount of time required to solve the time lock puzzle by assuming the use of the fastest available machine and an upper bound by assuming the use of the slowest machine among the participants. This implies that to access the original number used for the computation, a minimum amount of time is needed given a specific computing technology. Such a process may include each participant checking their local time when they generate the concealed local number and then checking again when they receive the other participants' shared numbers. If when the last received local number is shared, the minimum amount of time to access their own concealed number has not passed. The participants may be aware that all the information necessary for the creation of the final number has been distributed, therefore it is irrevocable, and, in this case, no participant has access to the full set of shared local numbers, therefore the final number will be 'fair' because no knowledge of the local number(s) could have been applied to manipulate the final number that is created.

Another example embodiment may include using logical topologies to select witnesses and to reduce the likelihood of corrupt witnesses. For example, corrupt witnesses will not benefit until the legitimate witnesses have signed, because confirming the transaction in a ring topology requires all ring witnesses first confirm via a confirmation message. Also, no legitimate witness will sign if the transaction is too old (i.e., too much time has lapsed). As a result, a reasonable time period must be established to provide at least one legitimate witness with enough time to have viewed enough information to confirm that the transaction is legitimate.

Figure 6:
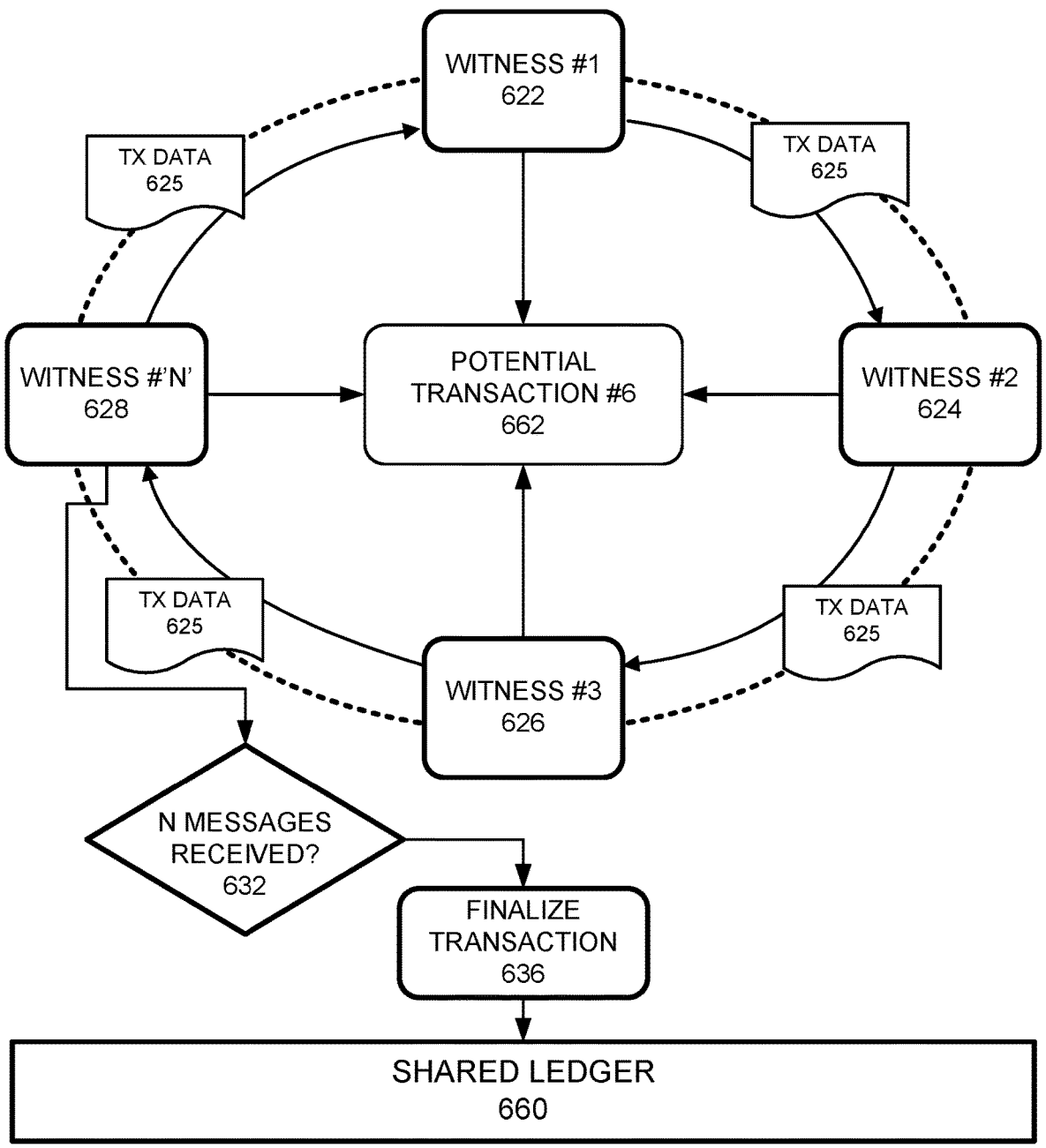
FIG. 6 illustrates a logic diagram of a ring topology of witnesses conducting a transaction according to example embodiments.

FIG. 6 illustrates a logic diagram of a ring topology of witnesses conducting a transaction according to example embodiments. Referring to FIG. 6, the logical ring witness topology 600 provides that multiples witnesses 622-628 are receiving the transaction data 625 and sending confirmation messages that the information in the transaction 662 is correct. The ring may require that all messages from all witnesses must be received 632 in order for the transaction to be finalized 636 and included in the shared ledger 660. If a logical ring configuration is not used to confirm the transaction, the legitimate witness may forward the transaction information to a logical star topology configuration as an alternative approach.

Continuing with the same example, a star may have 60 witnesses and use a Liskov protocol. In this example, as long as 40 of those witnesses are legitimate then the transaction will be approved. An expression to identify the odds that no more than 20 of the witnesses out of 60 are corrupt or that exactly 20 are corrupt may provide: $60 \ C \ 20 * (0.9\ ^\wedge 40) * (0.1\ ^\wedge 20)$ or approximately $4*10^\wedge 15*e^\wedge -4*10^\wedge -20$ which is less than 1/10,000 which may provide a result that is acceptable in terms of a threshold number or percentage of non-corrupt witnesses. If such a result is not acceptable, a larger number that is greater than 60 may also be used.

In another example, the number of participants in a star topology does not need to be specified since in the event that a corrupt member of a ring knows that even if they do not comply with the expected actions then the ring will still approve the transaction. As a result, the corrupt member will not provide false data and/or attempt to block the transaction because doing so will reveal themselves. The examples included provide for two witness message topologies including the ring and the star, where participants send and receive messages directly to witnesses. In the ring of FIG. 6, messages have been forwarded between witnesses, so that each witness knows that the other witnesses have seen the information 625. In the star configuration, each witness can observe the same information if there is no cheating since there is cross-checking between witnesses. In operation, a contract C1 is sent to witness set W1 and C2 to W2, etc. The contract may be cancelled before it is carried-out. Now, there are signed statements from W1 for C1 and W2 for C2. The approach could be used for falsifying an arrangement where W1 and W2 are witnesses to a "contract" which is different for two witness sets.

According to example embodiments, participants may be connected by some external network, such as the Internet. Options for communicating may include either a point-to-point connection and/or the use of a virtual network which utilizes an underlying connectivity strategy. According to one example, suppose 'p' (participants) plus 'w' (witnesses) entities are connected via a virtual ring topology used for a witnessing process. Here, each participant and witness is connected to two others. Given a particular transaction, each witness forwards a copy of the transaction plus a crypto-signature hash of one's own and other received witness affidavits. With 'N' entities, 'N' messages are sufficient to represent the entire ring. Each message contains a copy of the transaction and signed affidavits of prior witnesses within the virtual ring topology. Let message Tq(Wi) contain a copy of transaction Tq, plus confirmation that witness Wi observed the transaction via a signed affidavit. Let Mj (Wi) contain the message Mj along with the affidavit that Wi witnessed the transaction. Forwarding and witnessing once around the ring provides that each witness observes the witnessing of all previous witnessing. Going around twice, or once in each direction, then provides complete witnessing.

In one example, there are N participants. Each of those may be partitioned in disjoint sets, each of which are approximately the same size. Each member of a given set then can use the others as witnesses. For transactions between members of disjoint sets, the witnesses could be the union of the sets, or alternatively one could simply have each such disjoint set fully witness the transaction. The transactions are each cryptographically signed by each participant, so no spurious transaction can be entered into the distributed ledger. Any of various ways to choose witnesses might be used, for example having each set select at random a witness to be used for full witnessing with members of another set.

Figure 7:
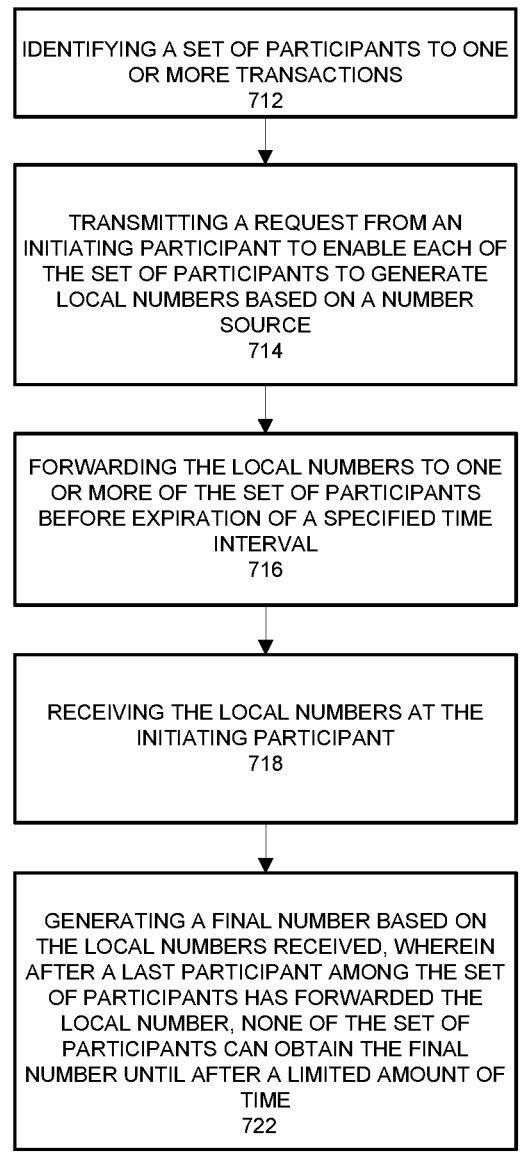
FIG. 7 illustrates a flow diagram of a fair number generation procedure according to example embodiments.

FIG. 7 illustrates a flow diagram of a fair number generation procedure according to example embodiments. Referring to FIG. 7, the example method 700 includes identifying a set of participants to one or more transactions 712, transmitting a request from an initiating participant to enable each of the set of participants to generate local numbers based on a number source 714, forwarding the local numbers to one or more of the set of participants before expiration of a specified time interval 716, receiving the local numbers at the initiating participant 718, and generating a final number based on the local numbers received, wherein after a last participant among the set of participants has forwarded the local number, none of the set of participants can obtain the final number until after a limited amount of time 722. The examples provide that none of the set of participants can obtain the final number by concealing the local numbers for the limited amount of time and during the forwarding of the local numbers, the set of participants are ordered in a logical ring and each of the set of participants forwards their respective local number to a neighbor participant on the ring in on one direction. Also, the final number is obtained by a predetermined minimum amount of computations performed by a computational device, and when each of the set of participants forwards their respective local numbers to the initiating participant, the initiating participant forwards all of the local numbers to all of the participants. Each of the set of participants performs a time check to verify whether a limited amount of time has passed between forwarding the local numbers and receiving the other participants' local numbers. The set of participants are members of a blockchain. One or more information sharing sessions conducted between the set of participants are logged as transactions on the blockchain.

Given a contingency, any surviving witness is sufficient to reconstruct a transaction. Thus the witness subsets should be large enough to ensure that at least one from each subset survives. Also, the selection of witnesses, and their ordering into rings, might be performed at random, so that that collusion is made unlikely. A procedure which guarantees that for N nodes, if the number of interfering nodes is less than some threshold r, they cannot influence the number. The resulting number is identified as (N,r) fair. The nodes are organized in a virtual ring with no more than r interfering nodes. Then, each node selects a random number. Then r+1 cycles are performed, each is performed only after the previous has been completed. Completion is signaled via encrypted public key broadcasts. In the first cycle, each node, transmits its selected random number to the clockwise next node, and encrypted by the public key of the next node. In r successive cycles, each node sends the collection of received random numbers to the next clockwise node, encrypted via the public key of that node. On completion of the r+1 cycles, all nodes broadcast the received random numbers and the originating node for that number. If they are consistent (no disparities), the N random numbers are X-ORed to produce a fair random number. Disparities can lead to the interfering nodes, as all messages are cryptographically signed.

An alternative approach is to have two collections of machines separated by a large physical distance perhaps being located on different continents. Let's suppose that light takes time 't' to traverse the distance. The collaborators on the two continents cannot communicate and respond to something they see if they are required to do so within an interval of size t. As a result, the process proceeds in three phases. Phase one provides that everyone selects a supposedly random number and reveals a one way encryption or hash of that number so they cannot later change the number. Phase two within each collection of machines provides that the original random numbers are revealed, but they must be revealed within a time interval of size t. If a majority of participants in a collection view the number in time it counts as being revealed. The revealed numbers of both collections are XOR'd and then in phase 3 hashed down to a smaller number of bits with a quality hash function. The output of that function is the new random number.

One issue with this scheme is that the collaborators in phase 2 can elect not to reveal their numbers in time after seeing the other revealed numbers and thus influence the XOR'd number. In fact, each collaborator can influence about one bit of the XOR on their continent. Collaborators on both continents could increase the odds that the first bit ends up being a 0 by selecting numbers that started with a 1 and then revealing, or not, their number depending on whether the XOR of their continent was going to end up with a 1 or a 0 in the first bit. A hash function should map any set and distribute it equally among the output possibilities. Thus having control of a few bits should not have an impact on the end result so long as the number of bits the input is shrunk is more than the number of collaborators. A strongly universal_n hash function is enough to assure that result. Implementation of a strongly universal_n function is difficult, but in fact most of the cryptographic hash functions are probably quite sufficient.

There may be circumstances where the continental protocol has advantages over the ring topology approach and vice versa. Once a random number has been selected it can be used to determine who will participate in the next round of determining a new random number. So repeated rounds of generation can be cheaper. With the ring, it is difficult for the collaborators to have an influence when the population is fairly sampled before the ring is used to generate the final random number, because to have an influence the collaborators must have approximately twice the square root of the number of people used to generate the number, and if sampled, they will have approximately the same proportion but the square root will be larger relative to the total number.

A computation of the ring algorithm strength may provide that there are N nodes, and assuming no more than r interferers or "crooks." The constraints for r must be determined in order that a safe number can be derived. It is assumed that the normal nodes transmit to their neighbors on the virtual ring, while the crooks cooperate with each other and can transmit by other approaches. The computation is safe if the normal nodes observe all the crook's random numbers before the crooks view all the normals. Consider a run (i.e., produced by consecutive nodes in the ring) of length L. It takes L+1 cycles for all the numbers in the run to be exposed to a neighbor of that run. It follows that if the longest run of crooks is shorter than the longest run of normals, then the computation is safe. We can then consider how to organize the crooks so that a minimum number produces the maximum number of nodes in normal runs no longer than the longest run of crooks. Suppose the longest run of crooks is v. Then the maximum number of normal nodes are limited to runs of no more than v by spacing single crooks that distance apart. The number of normal intervals is then r−v+1, which is the same as the number of crook intervals. It follows that v(r−v+1) is the number of normal nodes that can be disrupted by r crooks. A max crook interval v must be selected by computing the number $N(r,v)$ that can be disrupted by an attack using v and r crooks. The value of $N(r,v)$ for a range of the v and r parameters is identified such that to obtain the smallest r=r', $N(r',v)$ is greater or equal to N. Then for a given N, the largest integer r smaller than r' is the number of crooks against which the above algorithm will work effectively.

In one example, suppose N=36, consider v=4, $N(r,v)$ is then no more than v((r−v+1)+r. This is the number of crooks r plus the number of normal intervals of length v. If v=4, which yields 4(r−4+1)+r=5r−12 for the number of nodes that can be disrupted, for this to be the smallest r such that $N(r,v)$ is no smaller than N=36, there are r>=48/5=9.6. So if the crooks are arranged in this manner, N=36 is safe against 9 crooks. In another example, suppose v=3, then 3(r−3+1)+r=4r−6 is the total number of nodes disrupted. For this to be at least 36 r=42/4, or safe against 10 crooks. This is then not an efficient way off positioning crooks. Suppose v=5 then 5(r−4) is at least as large as 36, or r>=56/6 which is safe against 9 crooks. Suppose v=6, then 6(r−5)+r>=36, or r>=66/7, which is safe against 9 crooks. Suppose v=7 then 7(r−6+r)>=36, or r>=78/8 is safe against 9 crooks. Suppose v=8, 8(r−7)+r>=36, or r>=(36+56)/9=11.5 which is safe against 10 crooks. Larger values of v are less efficient and at least 9 crooks can be neutralized if N=36.

Each generation of a fair random number involves the generation of N numbers by the participants as well as the result. Once the N numbers are disseminated, A complete ordering can be obtained by ordering the N numbers according to their difference to the fair number. These numbers can be made large enough so that ties are unlikely. If a tie occurs, a new fair number can be derived. In practice, one may expect that only a few "crooks" need to be protected against, thus a fairly small value of N will suffice.

The approach is to have a ledger distributed among N participants, where each marks its own actions, and where the actions by a participant or node are broadcast to W witnesses. This approach attempts to reduce potential delays in communication and processing between nodes which have substantial computational loads, and which may be geographically dispersed. The result is N interacting ledgers, with processing controlled by an implicit concurrency control equivalent to those used in distributed databases. Messages may be encrypted for example via public key algorithms, and are typically cryptographically signed.

Witnessing the transactions is a critical part of the operation. The term complete witnessing is where only a single surviving witness is sufficient for retrieving a trusted version of the transactions that it witnessed. This permits a limited number of witnesses for any transaction, thus addressing the associated scaling issue. Witnesses are connected by a virtual ring network, where messages are combined and forwarded to avoid the $N**2$ messaging complexity associated with complete witnessing. A fair random number to partition the participants into subsets may be used with each connected via a virtual ring. The random number can also be used for deciding issues such as priority.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example network element 800, which may represent or be integrated in any of the above-described components, etc.

Figure 8:
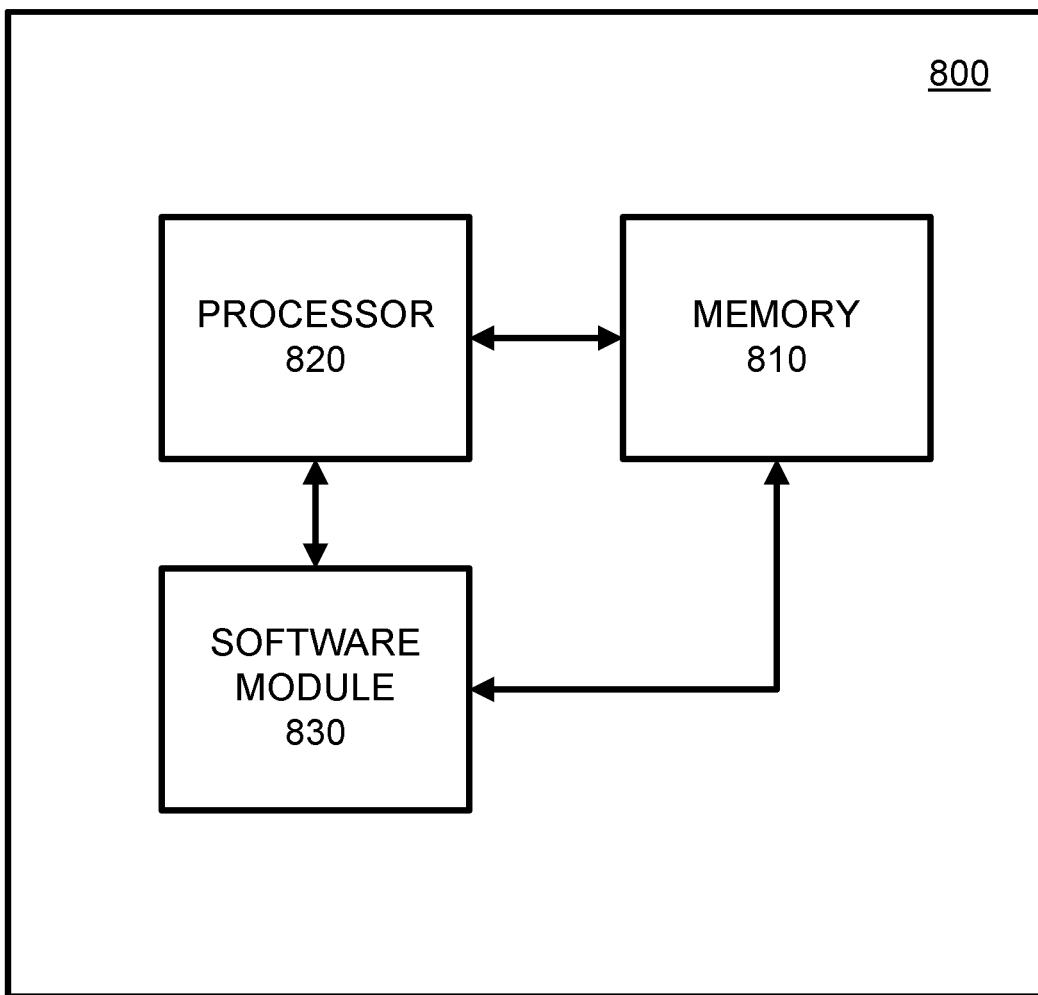
FIG. 8 illustrates an example network entity configured to support one or more of the example embodiments.

As illustrated in FIG. 8, a memory 810 and a processor 820 may be discrete components of a network entity 800 that are used to execute an application or set of operations as described herein. The application may be coded in software in a computer language understood by the processor 820, and stored in a computer readable medium, such as, a memory 810. The computer readable medium may be a non-transitory computer readable medium that includes tangible hardware components, such as memory, that can store software. Furthermore, a software module 830 may be another discrete entity that is part of the network entity 800, and which contains software instructions that may be executed by the processor 820 to effectuate one or more of the functions described herein. In addition to the above noted components of the network entity 800, the network entity 800 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computer-implemented method, comprising:
    performing, by a computing system, one or more transactions between a subset of participants of a shared ledger system or subsystem implemented using a blockchain, the shared ledger system or subsystem comprising the subset of participants and witnesses assigned to the subset of participants;
    generating, via the shared ledger system or subsystem, a separate list of transactions for each participant of the subset of participants;
    generating, via the shared ledger system or subsystem, a separate list of assigned witnesses for each participant, of the subset of participants, where no common witnesses occur between the subset of participants; and
    synchronizing, by the computing system, the one or more transactions exclusively by the subset of participants and the assigned witnesses.

2. The computer-implemented method of claim 1, wherein any participant that is a member of the subset of participants is a party to the one or more transactions performed between any combination of the subset of participants for any resources traded in the system or subsystem.

3. The computer-implemented method of claim 1, further comprising:
    receiving confirmation messages from one or more of the subset of witnesses, by the computing system;
    establishing a time threshold to complete the one or more transactions, by the computing system;
    determining, by the computing system, whether the confirmation messages have been received from all of the subset of witnesses prior to the time threshold expiring and whether to complete one or more of the transactions; and
    requiring, by the computing system, each of the witnesses to confirm the one or more transactions as completed shared ledger transactions by signing the one or more completed transactions and signing a time stamp associated with compliance of the time threshold.

4. The computer-implemented method of claim 3, further comprising:
receiving the confirmation messages from all of the subset of witnesses prior to the time threshold expiring, by the computing system; and
completing the one or more transactions based on the subset of participants and the assigned subset of witnesses, by the computing system.

5. The computer-implemented method of claim 3, further comprising:
once the time threshold has expired, determining, by the computing system, that only a portion of the confirmation messages were received from a portion of the subset of witnesses; and
cancelling the one or more transactions, by the computing system, responsive to the determining that only a portion of the confirmation messages were received.

6. The computer-implemented method of claim 1, further comprising:
assigning the subset of observers to one or more of the subset of participants and a specific type of transaction among the one or more transactions, by the computing system; and
verifying, by the computing system, that there is a threshold number proof of receipts for the first shared ledger transaction, wherein
the threshold number proof of receipts is equal to a number of the subset of participants to the one or more transactions multiplied by a number of the subset of witnesses to the one or more transactions.

7. The computer-implemented method of claim 1, further comprising:
queuing the one or more transactions, by the computing system;
determining, by the computing system, whether inventory of a product included in a first of the one or more transactions in the queue conflicts with any other of the one or more transactions; and
completing the first of the one or more transactions, by the computing system, when the inventory of the product is not in conflict with any other of the one or more transactions.

8. The computer-implemented method of claim 7, wherein one or more of the transactions in the queue have a different assigned witness than one or more of the remaining transactions, and one or more of the one or more transactions share one or more of the witnesses with one or more of the remaining one or more transactions.

9. The computer-implemented method of claim 1, further comprising:
completing, by the computing system, a first and a second transaction simultaneously when the subset of participants associated with the first transaction are different from the subset of participants associated with the second transaction.

10. The computer-implemented method of claim 1, wherein at least one of the first subset of the witnesses assigned to the subset of the one or more participants are union with at least one of the witnesses from a second subset of the witnesses assigned to a second subset of the one or more participants.

11. The computer-implemented method of claim 1, wherein one or more of the subset of witnesses are assigned to one or more of the transactions based on a random number.

12. An apparatus, comprising:
a processor configured to:
perform one or more transactions between a subset of participants of a shared ledger system or subsystem implemented using a blockchain, the shared ledger system or subsystem comprising the subset of participants and witnesses assigned to the subset of participants,
generate, via the shared ledger system or subsystem, a separate list of transactions for each participant of the subset of participants;
generate, via the shared ledger system or subsystem, a separate list of assigned witnesses for each participant, of the subset of participants, where no common witnesses occur between the subset of participants; and
synchronize the one or more transactions exclusively by the subset of participants and the assigned witnesses.

13. The apparatus of claim 12, wherein any participant that is a member of the subset of participants is a party to the one or more transactions performed between any combination of the subset of participants for any resources traded in the system or subsystem.

14. The apparatus of claim 12, further comprising:
a receiver configured to receive confirmation messages from one or more of the subset of witnesses, wherein
the processor is further configured to:
establish a time threshold to complete the one or more transactions,
determine whether the confirmation messages have been received from all of the subset of witnesses prior to the time threshold expiring and whether to complete one or more of the transactions, and
require each of the witnesses to confirm the one or more transactions as completed shared ledger transactions by signing the one or more completed transactions and signing a time stamp associated with compliance of the time threshold.

15. The apparatus of claim 14, wherein
the receiver is further configured to receive the confirmation messages from all of the subset of witnesses prior to the time threshold expiration, and
the processor is further configured to complete the one or more transactions based on the subset of participants and the assigned subset of witnesses.

16. The apparatus of claim 14, wherein once the time threshold has expired, the processor is further configured to:
determine that only a portion of the confirmation messages were received from a portion of the subset of witnesses, and
cancel the one or more transactions responsive to the determining that only a portion of the confirmation messages were received.

17. A non-transitory computer readable storage medium storing one or more instructions that when executed by a processor are configured to cause the processor to perform:
performing one or more transactions between a subset of participants of a shared ledger system or subsystem implemented using a blockchain, the shared ledger system or subsystem comprising the subset of participants and witnesses assigned to the subset of participants;
generating, via the shared ledger system or subsystem, a separate list of transactions for each participant of the subset of participants;
generating, via the shared ledger system or subsystem, a separate list of assigned witnesses for each participant, of the subset of participants, where no common witnesses occur between the subset of participants; and synchronizing the one or more transactions exclusively by the subset of participants and the assigned witnesses.

18. The non-transitory computer readable storage medium of claim 17, wherein any participant that is a member of the subset of participants is a party to the one or more transactions performed between any combination of the subset of participants for any resources traded in the system or subsystem.

19. The non-transitory computer readable storage medium of claim 17, wherein the one or more instructions are further configured to cause the processor to perform:

receiving confirmation messages from one or more of the subset of witnesses;

establishing a time threshold to complete the one or more transactions;

determining whether the confirmation messages have been received from all of the subset of witnesses prior to the time threshold expiring and whether to complete one or more of the transactions; and requiring each of the witnesses to confirm the one or more transactions as completed shared ledger transactions by signing the one or more completed transactions and signing a time stamp associated with compliance of the time threshold.

20. The non-transitory computer readable storage medium of claim 19, wherein the one or more instructions are further configured to cause the processor to perform:

receiving the confirmation messages from all of the subset of witnesses prior to the time threshold expiring; and completing the one or more transactions based on the subset of participants and the assigned subset of witnesses.

\* \* \* \* \*